US005589953A

United States Patent [19]

Tazawa et al.

[11] Patent Number: 5,589,953
[45] Date of Patent: Dec. 31, 1996

[54] IMAGE INPUT SYSTEM HAVING AN AUTO-FEEDER INCLUDING LOADING MAGAZINE AND DISCHARGE MAGAZINE ARRANGED SIDE BY SIDE AND METHOD

[75] Inventors: Masashi Tazawa; Nobuhiro Fujinawa; Kumiko Matsui, all of Kanagawa-ken; Maki Suzuki, Chiba-ken, all of Japan

[73] Assignee: Nikon Corporation, Tokyo, Japan

[21] Appl. No.: 427,230

[22] Filed: Apr. 24, 1995

[30] Foreign Application Priority Data

| Jun. 24, 1994 | [JP] | Japan | 6-143542 |
| Jun. 27, 1994 | [JP] | Japan | 6-144894 |
| Jun. 27, 1994 | [JP] | Japan | 6-144931 |
| Jun. 28, 1994 | [JP] | Japan | 6-146191 |
| Jun. 28, 1994 | [JP] | Japan | 6-146202 |
| Aug. 25, 1994 | [JP] | Japan | 6-200000 |

[51] Int. Cl.$^6$ ............................................. H04N 1/04
[52] U.S. Cl. ................... 358/498; 358/487; 358/474; 353/103; 353/113; 355/75; 394/371
[58] Field of Search .......................... 358/498, 487, 358/471, 474, 488, 494, 412, 400; 371/3.24, 3.18, 3.2, 4.11, 4.12, 4.22, 129, 273, 274, 177, 184; 353/103, 113, 114, 118; 354/275, 276, 174, 180, 181; 355/230, 75; 352/123

[56] References Cited

U.S. PATENT DOCUMENTS

| 3,598,483 | 8/1971 | Galbraith, Jr. | 353/113 |
| 3,645,612 | 2/1972 | Streicher et al. | 353/113 |
| 3,718,392 | 2/1973 | Harvey | 353/103 |
| 3,721,494 | 3/1973 | Stine | 353/103 |
| 4,114,166 | 9/1978 | Driscoll et al. | 354/276 |
| 4,183,651 | 1/1980 | Mills | 354/276 |
| 4,331,398 | 5/1982 | Kawarada et al. | 353/113 |
| 4,368,964 | 1/1983 | Carlson | 353/113 |
| 4,379,627 | 4/1983 | Naël | 353/113 |
| 4,382,664 | 5/1983 | Karl et al. | 353/103 |
| 4,756,616 | 7/1988 | Min et al. | 353/113 |
| 4,779,113 | 10/1988 | Morse et al. | 354/276 |
| 4,817,023 | 3/1989 | Yamaguchi et al. | 353/113 |
| 4,974,959 | 12/1990 | Keightley | 353/118 |
| 5,099,321 | 3/1992 | Igarashi | 358/487 |
| 5,233,376 | 8/1993 | Maron | 353/103 |
| 5,270,841 | 12/1993 | Watanabe | 358/498 |
| 5,297,785 | 3/1994 | Ricciardi | 271/3.18 |
| 5,387,954 | 2/1995 | Bizon | 353/103 |
| 5,440,362 | 8/1995 | Jones | 353/103 |
| 5,475,453 | 12/1995 | MacCarthy | 353/103 |

Primary Examiner—Edward L. Coles, Sr.
Assistant Examiner—Fan Lee
Attorney, Agent, or Firm—Oliff & Berridge

[57] ABSTRACT

An image input system includes an image input device for reading image information from a source document and a feeder for automatically inserting the source documents into the image input device. The feeder includes a loading magazine storing source documents and an adjacent discharge magazine storing source documents discharged from the image input device. The source documents travel along a transport surface within the feeder. A dividing board controls the position of the source documents within the feeder. Detectors are provided to monitor the loading operation. A method of reading image information using the image input system is also disclosed.

40 Claims, 27 Drawing Sheets

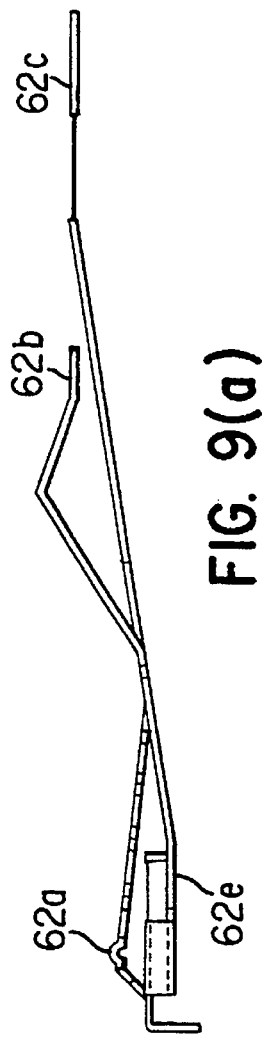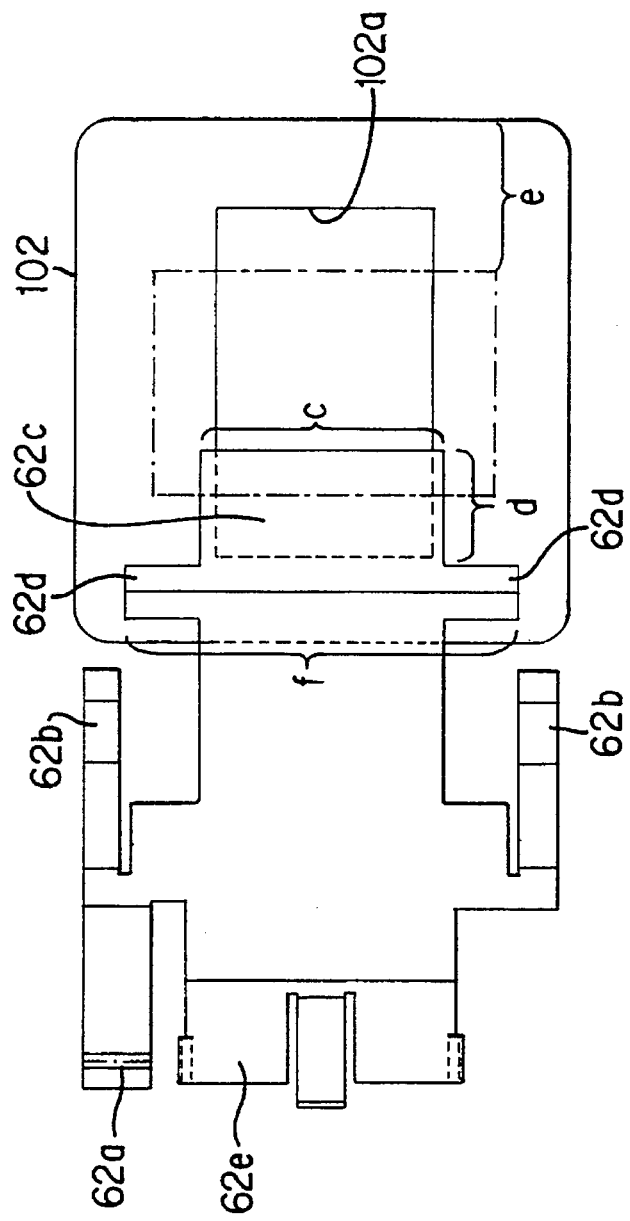

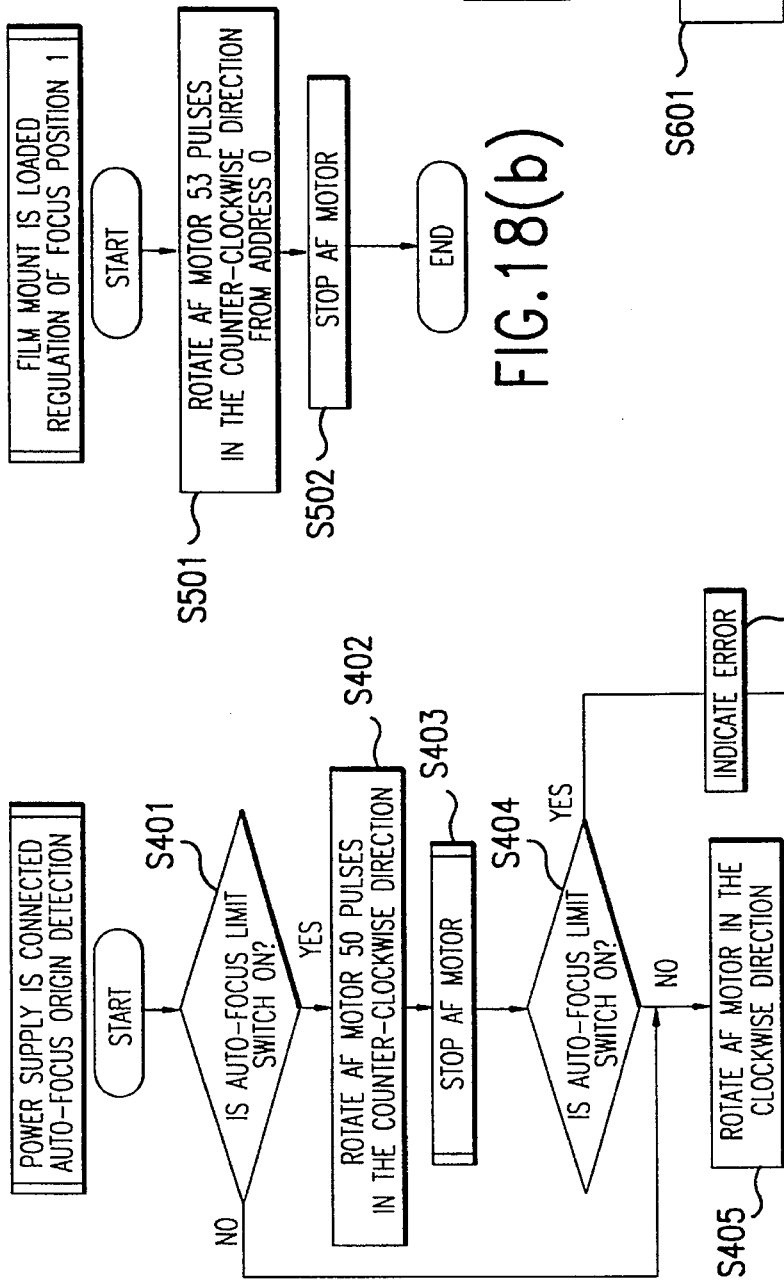
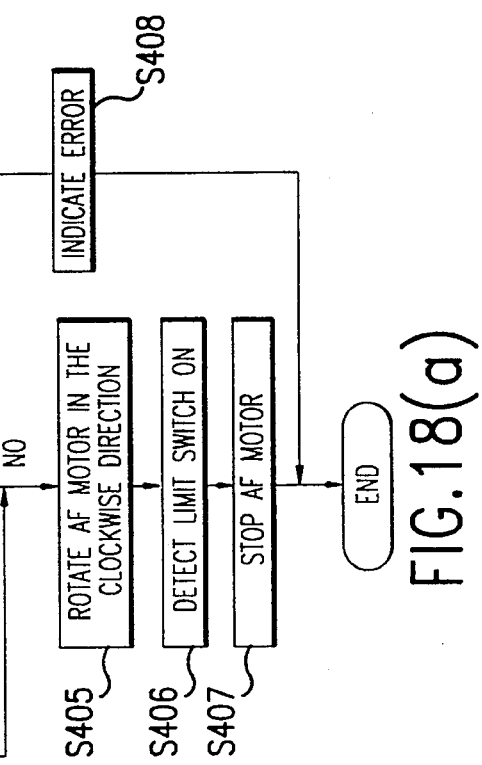
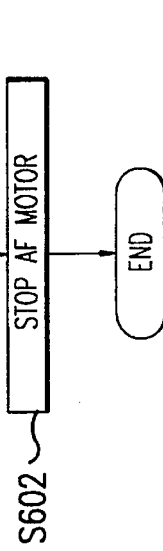

IMAGE INPUT SYSTEM HAVING AN AUTO-FEEDER INCLUDING LOADING MAGAZINE AND DISCHARGE MAGAZINE ARRANGED SIDE BY SIDE AND METHOD

BACKGROUND OF THE INVENTION

1. Field of the Invention

The present invention relates to an image input system having an auto-feeder that reads the image information of an original onto photographic film and the like through illuminating light, and in particular, to an image input system that can easily determine the presence or absence of an original in the carriage.

2. Description of Related Art

An example of a conventional image input system and auto-feeder is shown in FIG. 28. A case 101 of a main body of the image input system includes a recess 101a in an optical axis direction of the case. A holder 103 is positioned within the recess 101a and holds a removable film mount 102. A stage (not shown) holds the holder 103 and moves along the recess 101a. A light source component 104 and a charge-coupled-device (CCD) reading component 105 are positioned opposite each other on opposite sides of the recess 101a in the direction of the optical axis. A light source (not shown) is provided within the light source component 104, and a linear CCD (not shown) is provided within the CCD reading component 105. Light irradiated from the light source is directed to the film mount 102 by a collection lens 106 attached to the light source component 104. The light passing through the film mount 102 is read by the linear CCD. The linear CCD reads only one line of the original. By driving the stage with a motor, the entire aperture surface of the film mount 102 can be read by the linear CCD.

In the image input system described above, the recess 101a penetrates the case 101 in a direction perpendicular to the optical axis. The side of the case into which the film mount 102 is inserted and the discharge side can be independent of each other. In the conventional auto-feeder shown in FIG. 28, a side loading magazine 107 holding multiple film mounts 102 and a discharge side magazine 108 receiving and storing the film mounts 102 that have been read by the linear CCD are located on opposite sides of the recess 101a.

The film mounts 102 are pushed from the side loading magazine 107 by a pushing plate 109 and held inside the holder 103. Multiple film mounts 102 can be held in series within the holder 103. A newly inserted film mount 102 pushes the film mounts 102 that are already held inside the holder 103, and advances the film mounts 102 to a reading position. The film mounts 102 that have been read by the linear CCD are pushed out of the discharge side and drop in a side discharge magazine 108 for storage. By repeating this action, multiple film mounts 102 are continuously supplied, and the images are read. With this type of construction, the auto-feeder can complete all of the loading actions by repeating the loading action. This system, however, requires more space, which results in an overall increase in size.

Alternatively, if the film mount 102 loading and discharging openings are located on the same side of the case 101, the loading and discharge actions of the autofeeder must be separate operations. As a result, an autofeeder is not realized.

Additionally, when the film mount 102 loading and discharging openings are located on the same side of the case 101, if the power supply is accidentally cut off during the reading action or during stand-by and a film mount 102 is left in the image input system without being discharged, it is necessary to detect the presence of a film mount 102 in the image input system after the power supply is reconnected and to carry out any necessary discharge actions.

SUMMARY OF THE INVENTION

It is an object of the present invention to provide an image input system having a feeder that uses the same opening for film mount loading and discharging.

It is another object of the present invention to provide an image input system that prevents loading of multiple source documents during a single loading action.

It is another object of the present invention to provide an image input system that detects the presence of source documents within a feeder and controls the operation of the image input device when no source documents are present.

In order to accomplish these and other objectives, an image input system is provided having an image input device, a feeder and a controller. The image input device according to an embodiment of the present invention includes a carriage for holding a film mount containing a source document. The carriage is movable in a secondary scanning direction within an image input device. The image input device includes a light source to emit light along an optical axis to illuminate the source document on the film mount. The optical axis is substantially orthogonal to the secondary scanning direction. A position adjustment mechanism adjusts the position of the carriage in the optical axis.

Embodiments of the present invention include a controller to control the operation of the position adjustment mechanism. The controller operates the position adjustment mechanism to position the carriage in a first predetermined position during a loading operation of the source document. The carriage is positioned in a second predetermined position during a discharge operation of the source document from the image input device.

The image input system according to an embodiment of the present invention includes a feeder to load film mounts containing the source documents into the image input device during a loading operation. The feeder also retrieves the source documents from the image input device during the discharge operation. The feeder includes a loading magazine storing source documents to be loaded into the image input device during the loading operation and a discharge magazine storing source documents discharged from the image input device. The loading magazine and the discharge magazine are positioned in parallel in side by side relationship within the feeder. The feeder includes a transport surface extending perpendicular to an edge surface of the loading magazine and an edge surface of the discharge magazine. The film mounts travel along the transport surface during loading and discharging operations. The film mounts are loaded from the feeder and discharged into the feeder through a single opening aligned with an opening on the image input device.

In an embodiment of the present invention, the discharge magazine is positioned adjacent a front side of the feeder adjacent the image input device. The loading magazine is positioned adjacent the discharge magazine in spaced relationship with the image input device. The feeder also includes a dividing board used to control the direction of movement of the film mounts within the feeder during loading and discharging operations. The dividing board includes a pressure unit that presses the film mount against the transport surface during the loading operation. Also, the dividing board includes an engaging unit that permits only one film mount to be fed into the image input device at a time. A push-up unit on the dividing board pushes a discharged film mount upward toward the discharge magazine so that the film mount is parallel to the transport surface.

The feeder also includes an extrusion board that inserts the film mounts from the loading magazine into the image input device. The extrusion board has one edge that is perpendicular to the transport surface and an opposite edge that is less than perpendicular to the transport surface.

The feeder includes detectors provided on opposite edges of the transport surface to detect the completion of the loading operation and a transport operation of a film mount within the feeder. The first and second detectors detect the position of the extrusion board on the transport surface. With these detectors, it is possible to detect when the loading magazine is empty. When this occurs, the controller will display an error signal and stop operation of the image input device and feeder.

The feeder includes a pair of rollers for discharging a film mount from the image input device into the feeder. The rollers engage the discharge film mount drawing the film mount into the feeder. The rollers have a contact surface. During the discharge operation, the position adjustment mechanism positions the carriage such that the contact surface on the pair of rollers and a central surface on the carriage nearly coincide. This ensures that the film mount will be properly discharged into the feeder.

A method of reading image information using an image input system according to an embodiment of the present invention is also disclosed. The position of the carriage within the image input device is adjusted such that it corresponds to the loading position. The source document is then loaded from the loading magazine in the feeder through the opening in the feeder into the image input device. The film mount containing the source document is then positioned on the carriage. Image information is then read from the source document as the carriage moves in the secondary scanning direction. The position of the carriage is then adjusted when image reading is complete to correspond to a discharging position. The film mount is then discharged from the image input device into the discharge magazine in the feeder. A loading operation is then performed for a subsequent film mount.

BRIEF DESCRIPTION OF THE DRAWINGS

The invention will be described in conjunction with the following drawings in which like reference numerals designate like elements and wherein:

FIG. 9(a) is a side surface view of the separating spring of FIG. 5;

FIG. 9(b) is a plan view of the separating spring of FIG. 5;

FIGS. 18(a)–(c) are flow charts depicting the auto-focus operating sequence;

DETAILED DESCRIPTION OF PREFERRED EMBODIMENTS

An embodiment of the image input system of the present invention is described below with reference to the drawings.

The image input device according to an embodiment of the present invention is shown in FIGS. 1–4. The image input device includes an illuminating optical component that conducts illuminating light onto a film mount holding a source document (such as, for example, film or paper used as an original). A scanning component moves a carriage holding the film mount and scans the image. An optical collection component composes an image onto a CCD from light passing through the film mount.

Figure 1:
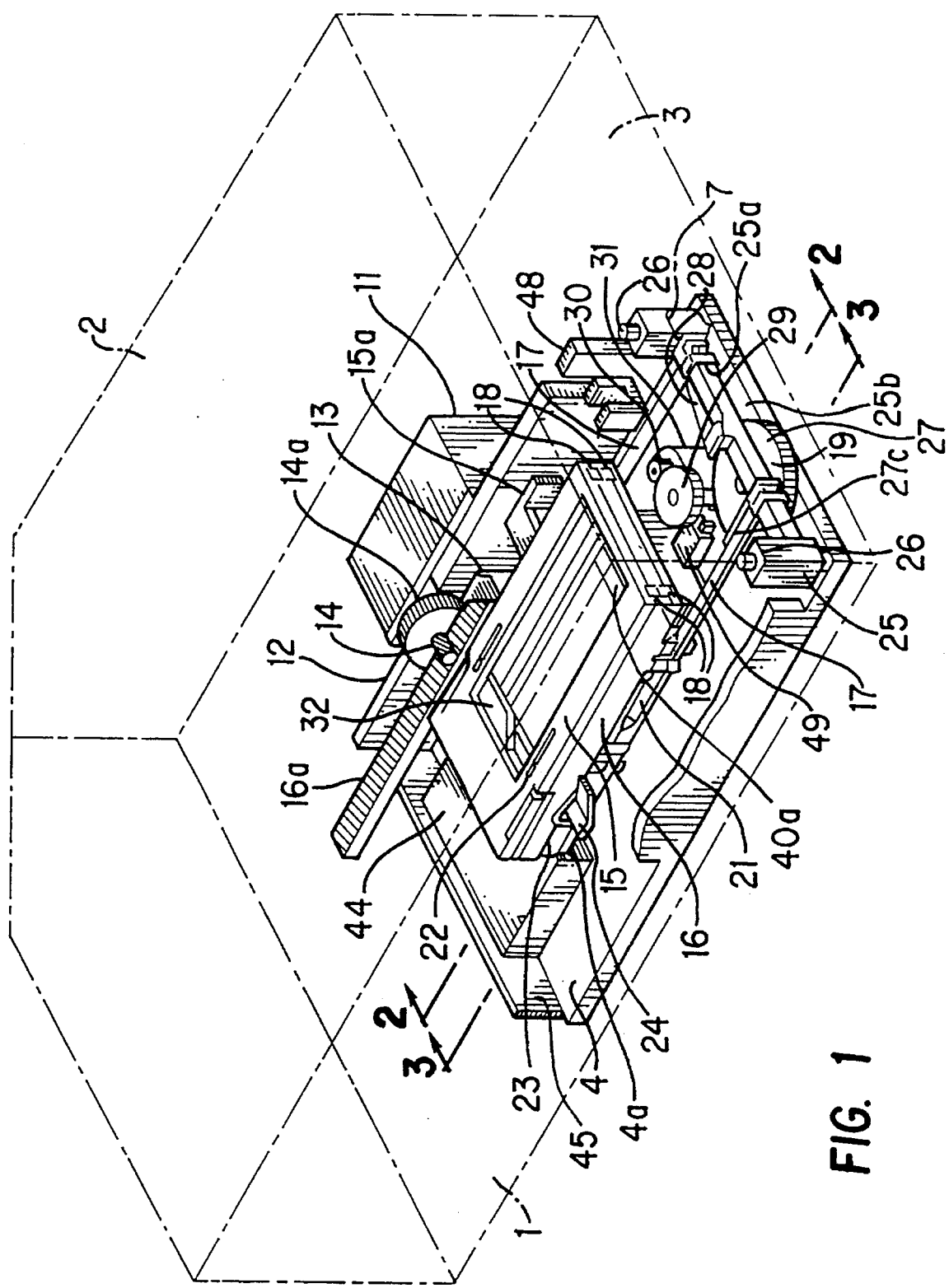
FIG. 1 is an oblique view of an embodiment of the image input device of the present invention.
Figure 2:
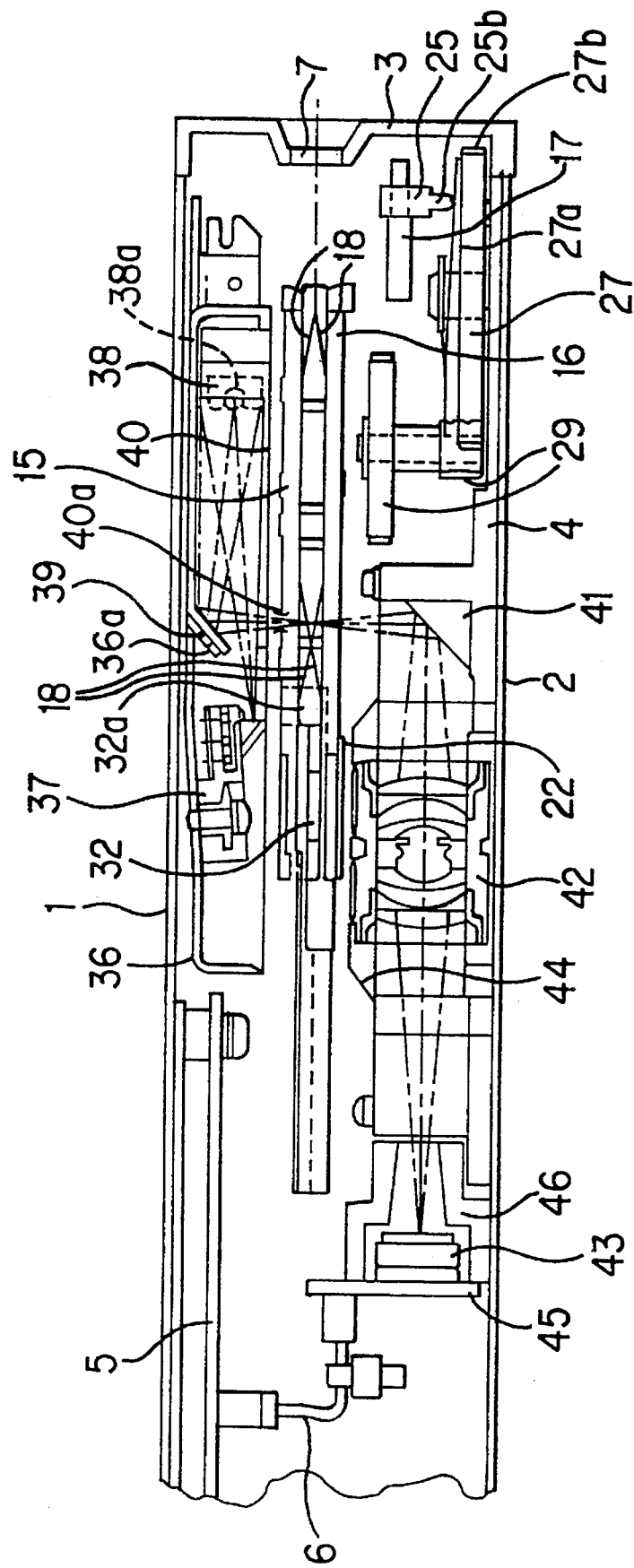
FIG. 2 is a cross-sectional side view of the image input device along line 2—2 of FIG. 1.

The image input device is housed within a case. As shown in FIGS. 1 and 2, the case includes an aluminum die-cast body 1, an aluminum top cover 2 covering the top of the body 1, and a polycarbonate front surface panel 3 covering the front surface of the body 1. A main base plate 5 and a mechanical body 4 house an image reading device. The image reading device includes the above-referenced scanning component, an illuminating optical component, and a collecting optical device. The image reading device is attached with screws to the body 1. A front side of the top cover 2 is connected to the front surface panel 3. A rear side of the top cover 2 is affixed to the body 1 with a fastener such as a screw (not shown). The top cover 2 and the front surface panel 3 cover the image reading device.

As shown in FIG. 2, the main base plate 5 and the mechanical body 4 are connected by four groups of harnesses 6. An opening 7 is provided in the front surface panel 3 for loading source documents. The front surface panel 3 may also include an LED window (not shown) for condition indication. A surface on the body 1 opposite the front surface panel 3 has a larger opening (not shown). The opening permits connection of various connectors on the main base plate 5 such that the device can be connected to a host computer or the like using an SCSI interface or the like.

As shown in FIGS. 1–4, the scanning component includes a carriage component having a mechanism for holding and moving the film mounts. The scanning component further includes a film focus adjustment mechanism and a motor component having a driving force transmitting mechanism for transmitting the motor driving force to the carriage component. The motor component includes a stepping motor 11 and a speed-reducing gear 14a for reducing the speed of the rotation of the stepping motor 11. The speed-reducing gear 14a is integrally formed with a pinion gear 14. The motor component is affixed to a motor installation plate 12. The motor installation plate 12 is affixed to the mechanical body 4.

The stepping motor 11 rotates the motor gear 13 connected to the motor shaft (not shown). The motor gear 13 rotates the pinion gear 14 via the speed-reducing gear 14a. The stepping motor 11 rotates one step of 0.9 degrees for every one line of the image.

The carriage component includes a carriage 15 and a rack carriage 16, positioned opposite each other. The carriage component can move and is guided by parallel guide bars 17. The parallel guide bars 17 are held between a slotted portion 4a of the mechanical body 4 and focus blocks 25. Two film depressing springs 18 are affixed to both ends of the opposing surfaces of the carriage 15 and the rack carriage 16. The film depressing springs 18 contact the film mounts 102 holding the source documents when the mounts are inserted between the carriages 15 and 16.

The film mounts 102 will always be centered between the carriage 15 and the rack carriage 16 by balancing the force of the film depressing springs 18, even when film mounts 102 of different thicknesses are inserted between the carriages 15 and 16. The center of the carriage 15 and the rack carriage 16 is optically focused. When the mounts are of different thicknesses and the emulsion surface of the film is centered in the mount, a focus adjustment is unnecessary by centering a manual focus cam 27, described hereafter.

As shown in FIG. 1, a helical rack 16a is formed with the rack carriage 16 and extends parallel to the direction of movement of the carriage. The pinion gear 14 meshes with the helical rack 16a and transmits the driving force from the stepping motor 11, moving the carriage 15 and the rack carriage 16. The origin detection of the direction of movement (secondary scanning direction) is carried out by an arm component 15a protruding from the carriage 15 and a photo sensor 48 affixed to the mechanical body 4.

Figure 4:
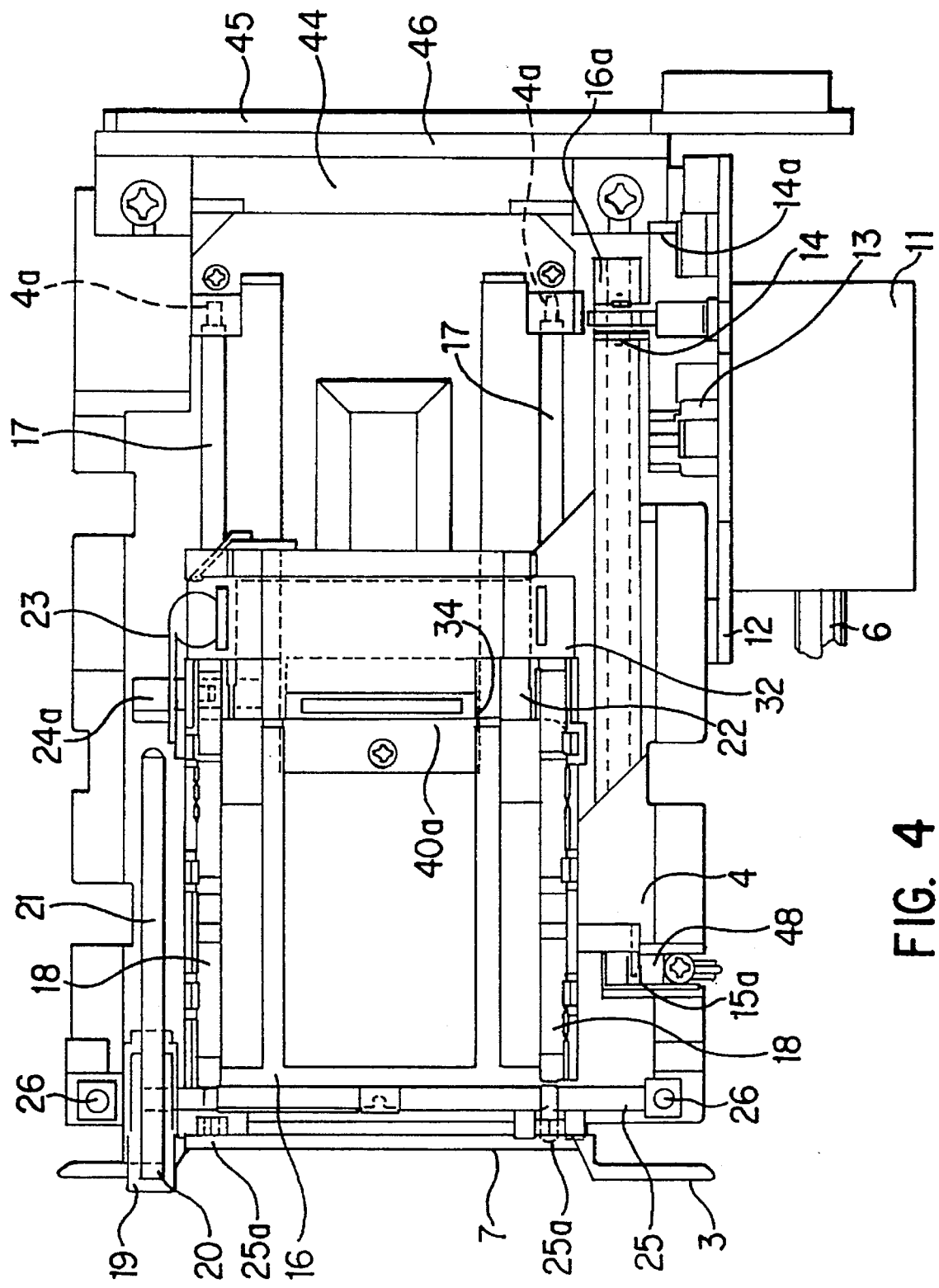
FIG. 4 is a plan view depicting the carriage of FIG. 1 adjacent the front surface panel side.

The ejection mechanism will now be described. As shown in FIG. 2, an ejection plate 22 slides along the rack carriage 16. As shown in FIG. 4, an ejector spring 23 is attached to the rack carriage 16. The ejector spring 23 contacts the ejection plate 22 and forces the ejection plate 22 in the film mount discharge direction. The movement of the ejection plate 22 in the discharge direction is controlled by a connecting plate 24 attached to the rack carriage 16. The connecting plate 24 is rotatable about an axis. A portion 24a of the connecting plate 24 having an inclined surface of approximately 45 degrees protrudes past the rack carriage 16. The inclined surface portion 24a is opposite the portion connected to the ejection plate 22.

Figure 3:
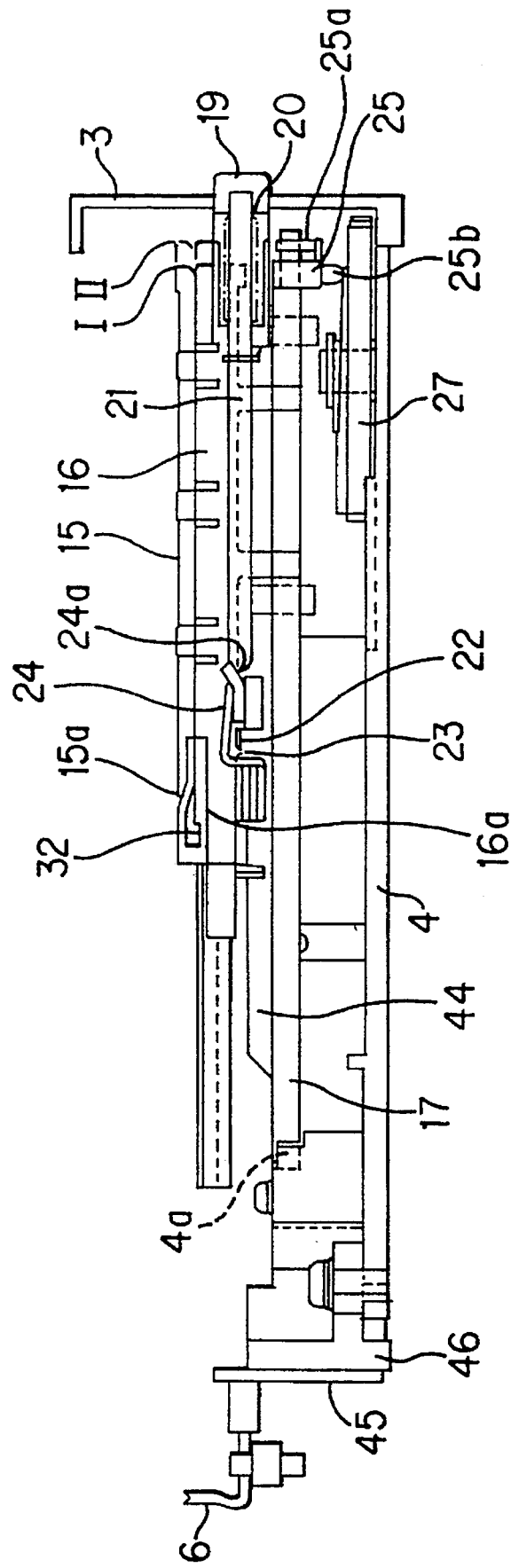
FIG. 3 is a cross-sectional side view of the image input device along line 3—3 of FIG. 1.

As shown in FIGS. 3 and 4, an ejector button 19 protrudes through the front surface panel and is biased by a button spring 20. An ejection rod 21 is connected to the ejector button 19. An E-ring (not shown) is attached to the ejection rod 21 to prevent the ejection rod 21 from separating from the ejector button 19. A front end of the ejection rod 21 opposite the ejector button, has a conical surface of about 45 degrees.

The carriage component of the film mount receiving and storing component always returns to the carriage return position I shown in FIG. 3, after the source document has been loaded and after the image data has been read. When the carriage component is in the carriage return position I, the forty-five degree conical surface of the ejection rod 21 contacts the forty-five degree surface of the connecting plate 24 when the ejector button 19 is depressed. When the ejector button 19 is held in a depressed position, the portion of the connecting plate 24 connected to the ejection plate 22 rotates, separating the portion from the rack carriage 16. The ejection plate 22 is separated from the connecting plate 24 and can move in the film mount discharging direction. The film mounts are discharged by the force of the ejection spring 23.

An auto-eject feature can automatically discharge the film mounts by rotating the stepping motor 11 and moving the carriage component to a film mount eject position II, shown in FIG. 3.

The focus adjustment mechanism will now be described in connection with the figures. Focus adjustment is performed by reciprocally moving the guide bars 17 in a focus direction. As shown in FIG. 3, one end of the guide bars 17 is connected to the focus blocks 25. An opposite end is connected to the mechanical body 4. As shown in FIG. 1, parallel pins 26 affixed to the mechanical body 4 are inserted into both ends of the focus blocks 25. This permits the focus blocks 25 to slide in the focus direction. Each focus block 25 includes a guide bar restraining component 25a. A projecting component 25b is located between the guide bar restraining components 25a. The projecting component 25b has a spherical end contacting the focus cam 27 through the force of a focus block restraining spring 28. A cam surface 27a of the focus cam 27 forms a slanted surface approximately 2 mm high in the focus direction. Focus adjustment is performed by rotating the focus cam 27. In an embodiment of the present invention, the focus position can be changed by 2 mm by rotating the focus cam 27 through ninety degrees. By positioning the projection 25b between the guide bars 17, the guide bars 17 can be reciprocally moved in the focus direction without inclining even when checking and verifying backlash occurs between the focus blocks 25 and the parallel pins 26. The image reading position is at the center of the guide bars 17 in a lengthwise direction. By changing the position of one end of the guide bars 17 approximately ±1 mm through the focus cam, a focus adjustment of approximately ±0.5 mm is possible.

As shown in FIG. 1, a gear is formed on the side surface of the focus cam 27. The gear is connected to an AF (auto-focus) motor gear 30 via two idler gears 29 attached to the same shaft. The AF motor gear 30 is attached to the shaft of the AF motor 31. Auto-focusing is possible by rotating the AF motor 31. Origin detection is carried out using the protruding component 27c on the side surface of the focus cam 27 and the AF limit switch 49 affixed to the mechanical body 4.

As shown in FIG. 2, the illuminating optical system includes an illumination base 36, an LED block 37, a mirror 38, a forty degree mirror 39, and an illuminating system lid 40. The optical system is attached to the main body 4 by a suitable fastener such as a flathead screw.

The LED block 37 includes a light source attached to the top of the illuminating base 36 via an insulating sheet with an insulating collar and a screw. The mirror 38 has a cylindrical protuberance 38a on a side surface. The protuberance 38a serves as an axis for rotatably attaching the mirror 38 to the illuminating base 36. The position of the mirror 38 is fixed using a screw after the angle has been adjusted. The forty degree mirror 39 is attached to a turned up component 36a formed on the illuminating base 36. The illuminating system cover 40 is attached by connecting components formed in two places in the illuminating base 36. The cover 40 covers the LED block 37, the toric mirror 38, and the forty degree mirror 39. A slit 40a is provided in the illuminating system cover 40 below the center of the 40 degree mirror. The slit 40a permits illuminating light to pass through the cover 40 to the film mount 102. Any external light that shines into the interior of the illuminating optical system is intercepted by the illuminating system cover 40.

As shown in FIG. 2, the projection optical system includes a forty-five degree reflecting mirror 41, a projection lens 42, a CCD 43, and a projection system cover 44. The projection optical system is arranged into divided portions by partitions on the three sides of the mechanical body 4. The forty-five degree reflecting mirror 41 is affixed to the mechanical body 4 using for example an adhesive. The projection lens 42 is formed symmetrically by four groups of six lenses, and is affixed into the lens chamber by separating rings and restraining rings. The lens chamber is attached to the mechanical body 4 by a set screw. The CCD base plate 45, which is equipped with a CCD 43, is attached to the mechanical body 4 via the CCD holder 46. A projection optical system cover 44 is attached with screws to the perimeter of the portion divided by partitions.

According to the construction described above, the path of the light that passes the original source document on the film mount is changed ninety degrees by the forty-five degree reflecting mirror 41. The light is then composed into an image on the CCD 43 by the projection lens 42. The CCD holder 46 accomplishes the roles of light interception and dust-proofing. The projection system cover 44 also serves to carry out light interception and dust-proofing for the entire projection optical system, as well as restraining the guide bars 17 of the scanning component.

Shading correction will now be described. The LED block 37 illuminates the source document on the film mount. As shown by the diagonal lines of FIG. 4, a passing space 34 exists between the film mount 102 and the edge detecting plate 32. Space 34 is never completely filled, even when the ejection plate 22 moves to the eject position. The shading space 34 is not obstructed when a film mount is inserted or during the ejecting operation. Light passes through the source document on the film mount and space 34. The light is detected on the CCD 43 as light amount data. The light amount data passing through the film mount without stopping is used for shading correction. The CPU 113 can then adjust the shading. With this arrangement, the shading correction can be reliably performed.

Color source documents can be used in the image input device according to the present invention. Red, green, and blue light illumination is performed sequentially. The light passes through the source document of the film mount and space 34. The light 10 is detected by the CCD 43 as color amount data. Using this data, the CPU 113 can then adjust the color balance of the image.

An embodiment of an auto-feeder of the present invention that automatically loads and discharges film mounts in the referenced image input device is described hereafter, with reference to FIGS. 5–9. The auto-feeder includes a loading magazine component storing film mounts 102 to be read by the image input device. A discharge magazine component stores film mounts 102 after image reading is complete. A loading mechanism component loads the film mounts 102 into the image input device. A discharge mechanism component removes the film mounts from the image input device. The above-mentioned components are attached to a feeder block 51 and a feeder chassis 52.

Figure 5:
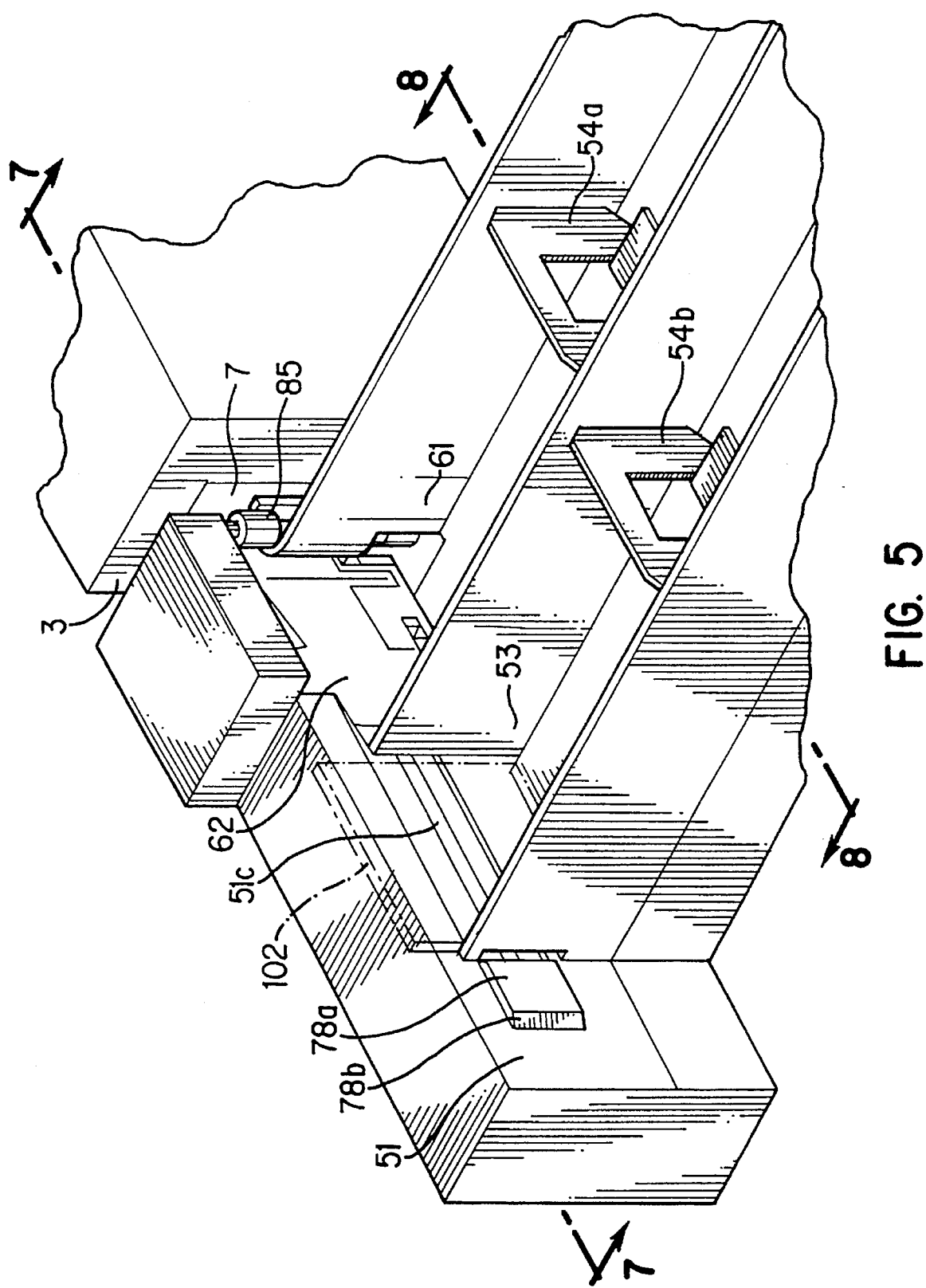
FIG. 5 is an oblique view of an embodiment of a feeder used with the image input device of the present invention.
Figure 6:
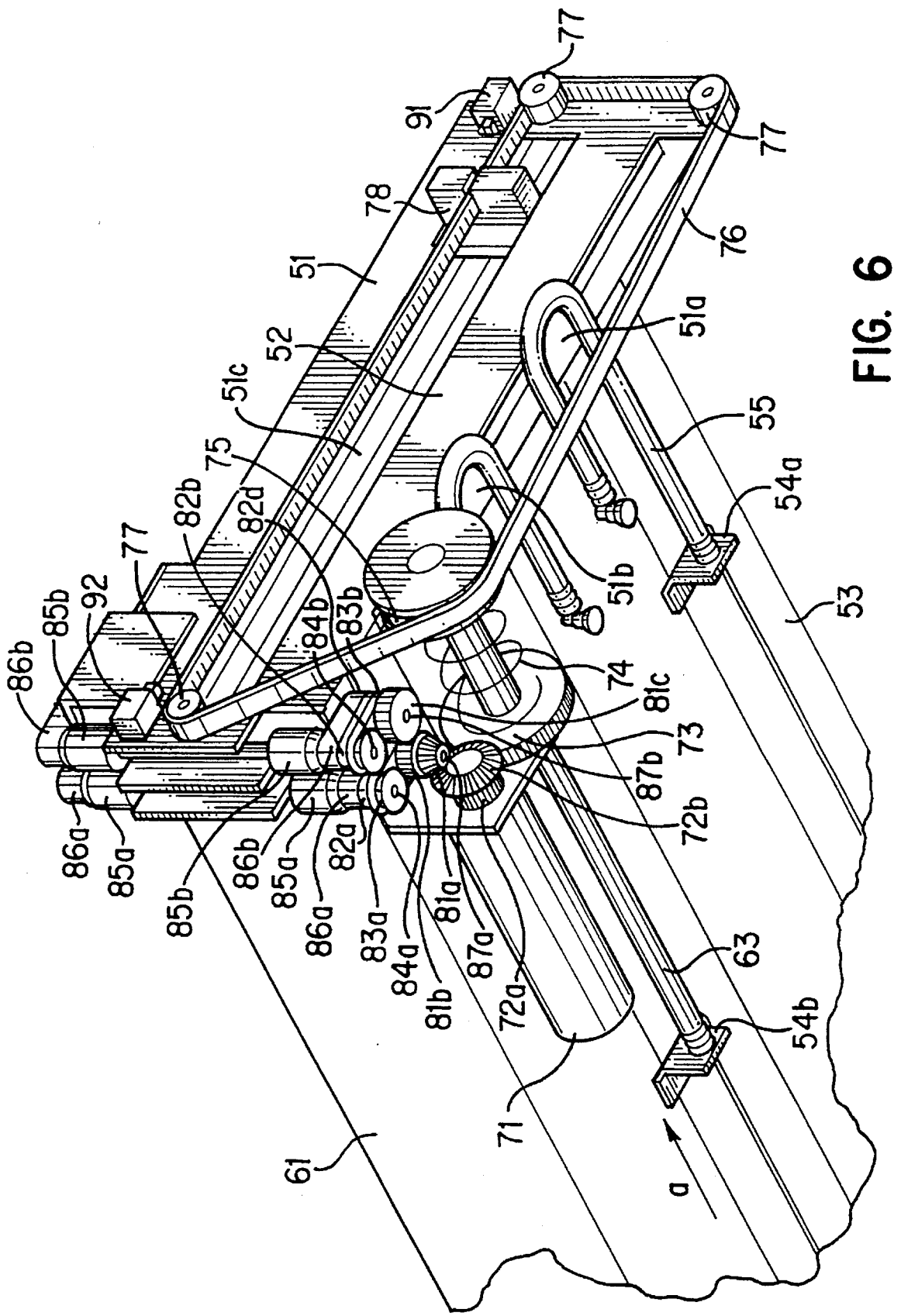
FIG. 6 is a rear oblique view of the feeder of FIG. 5.
Figure 8:
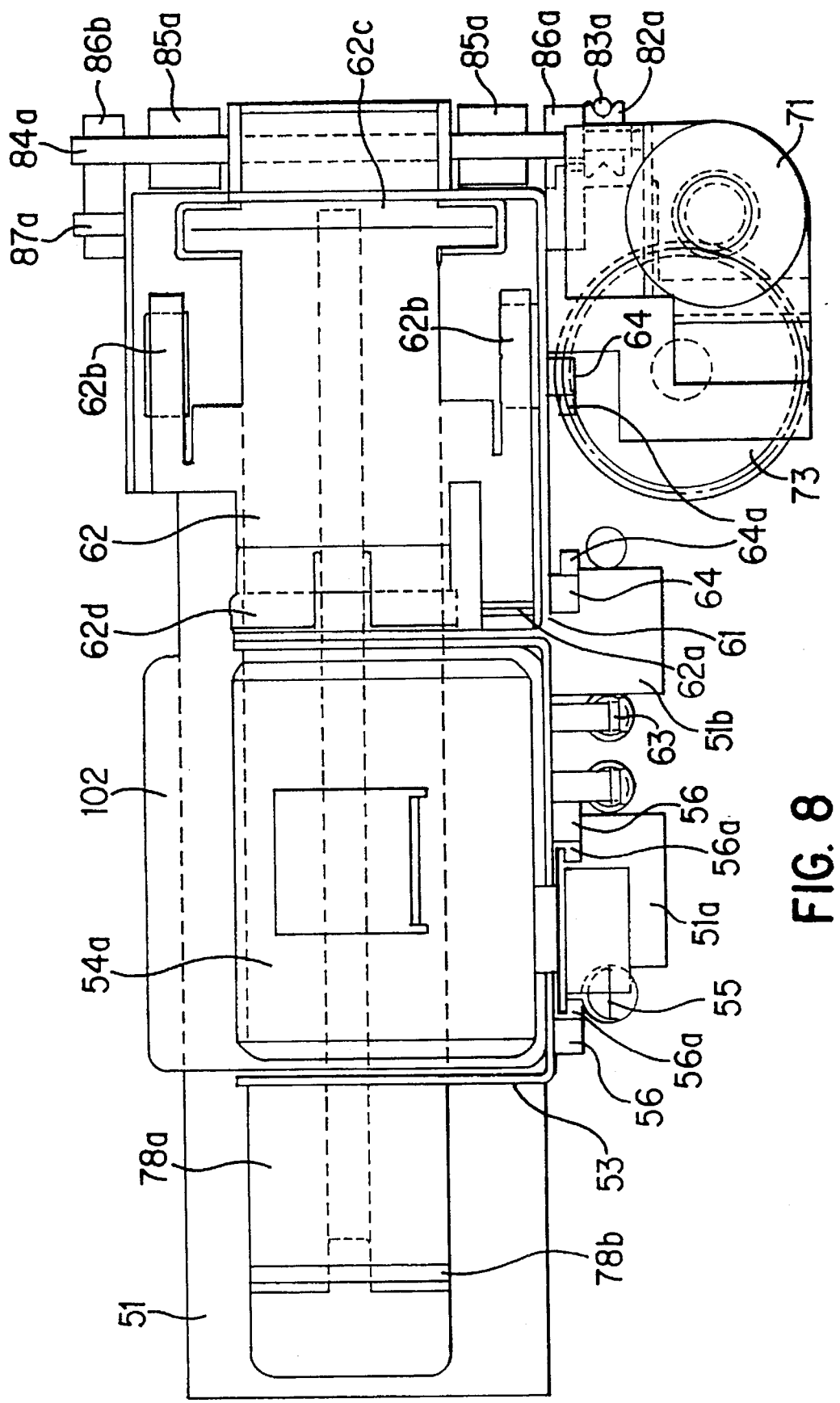
FIG. 8 is a cross-sectional view of the feeder along line 8—8 of FIG. 5.

As shown in FIGS. 5 and 6, the loading magazine component includes a loading magazine 53 housing the film mounts 102. A mount restraining plate 54a holds down the film mounts 102 onto the feeder block 51. The mount restraining plate 54a is held against the side of the feeder block by a tension spring 55. The tension spring 55 wraps 180 degrees around a cylindrical portion 51a of the feeder block 51 to save space and applies force to the restraining plate 54a. As shown in FIG. 8, a set of rails 56 is attached to the bottom surface of the loading magazine 53. The rails 56 extend in the direction of movement of the mount restraining plate 54a. Drop-offs 56a are provided at the ends of the rails 56. The drop-offs 56a lock the mount restraining plate 54a by allowing the mount restraining plate 54a to drop in so that the mount restraining plate 54a does not reach the feeder block 51.

As shown in FIGS. 5 and 6, the feeder includes a discharge magazine component 61. The film mounts 102 discharged from the image input device are inserted and stored in the discharge magazine component 61. The discharge magazine component also includes a separating spring 62 and a mount restraining plate 54b that holds the film mounts to the separating spring 62. The mount restraining plate 54b is held against the side of the separating spring 62 by a tension spring 63. The tension spring 63 wraps 180 degrees around a cylindrical portion 51b of the feeder block 51 to save space and applies force to the restraining plate 56b. Rails 64 are attached to the bottom surface of the discharge magazine 61 for guiding the mount restraining plate 54. Drop-offs 64a are provided at the ends of the rails 64. The drop-offs 64a lock the mount restraining plate 54b by allowing the mount restraining plate 54b to drop in so that the mount restraining plate 54b does not reach the feeder block 51.

The amount of spring force from tension spring 55 acting on the mount restraining plate 54a is stronger than the amount of spring force from tension spring 63 acting on the mount restraining plate 54b. Tension spring 55 is stronger than spring 63 to ensure that the film mount 102 is firmly held against the feeder block 51. This ensures that the film mount 102 will engage the pushing plate 78 when the film mount 102 is pushed by the discharge plate 78. It is desirable that the spring force amount from spring 55 be such that the film mount 102 closest to the feeder block 51 is held against the feeder block 51, even when the maximum number of film mounts 102 is stored in the loading magazine 53.

The discharge action is carried out by a rubber roller 85 (described hereafter). The rubber roller 85 applies a load to facilitate discharge of the film mounts. When the force from the tension spring 63 is too strong, the discharge action cannot be accomplished smoothly. It is desirable that the spring force applied by tension spring 63 be such that the film mounts 102 in the discharge magazine 61 do not topple over.

Furthermore, it is desirable to make the spring force constant for tension spring 55 and tension spring 63 such that the applied force does not change significantly when the number of film mounts in each magazine changes.

The separating spring 62 is formed as a nearly rectangular plate, as shown in FIG. 9(b). One end of the separating spring 62 is affixed to the end surface of the discharge magazine. A tongue-shaped classifying component 62a prevents two or more film mounts 102 supplied from the loading magazine 53 from piling up. The classifying component 62a is located on one side of the separating spring 62 and extends toward the fixed end. A pair of arm components 62b are provided on both sides of a central portion of the separating spring 62. The arm components 62b extend from spring 62 in a direction opposite to the tongue shaped classifying component 62a. The pair of arm components 62b push the loaded film mounts 102 against the feeder block 51. Additionally, the arm components 62b direct the film mounts 102 discharged into the discharge magazine to run flat along the feeder block 51. A separating component 62c is provided on the free end of the separating spring 62 to separate the loaded film mounts 102 and the discharged film mounts 102.

The width of the separating component 62c of the separating spring 62 is larger than the width of the short direction of the frame aperture 102a of the film mount 102 and smaller than the inside width of the rubber roller 85 that is connected to the roller shaft 84 (described hereafter). This prevents the separating spring 62 from falling into the frame aperture 102a and scratching the source document when the film mount 102 passes the separating spring 62.

The normal orientation of the frame aperture 102a of the film mounts 102 inside the magazine is matched with the reading range of the image input device in the horizontal direction. However, if the user mistakenly inserts the film mounts 102 so that the frame aperture 102a is oriented in the vertical direction, shown in phantom lines in FIG. 9(b), the width of dimension c of the separating component 62c is such that the separating spring 62 will fall into the frame aperture 102a. Supporting components 62d extend from opposite sides of the separating components 62c of the separating spring 62. When the dimension d from the supporting component 62d to the front end of the separating component 62c is made shorter than the dimension e between the long direction of the frame aperture 102a and the outside of the film mount 102, the source document will not be scratched even if the user mistakenly inserts the film mount 102 so that the aperture frame 102a is in the vertical direction. Additionally, the width f of the supporting components 62d is larger than the width of the frame aperture 102a of the film mount 102. When the width of the gap between the separating component 62a and the feeder block 51 is smaller than the thickness of two of the thinnest film mounts 102, two film mounts 102 will never pile up on top of each other. Horizontal component 62c is provided on the fixed end of the separating spring 62.

Figure 7:
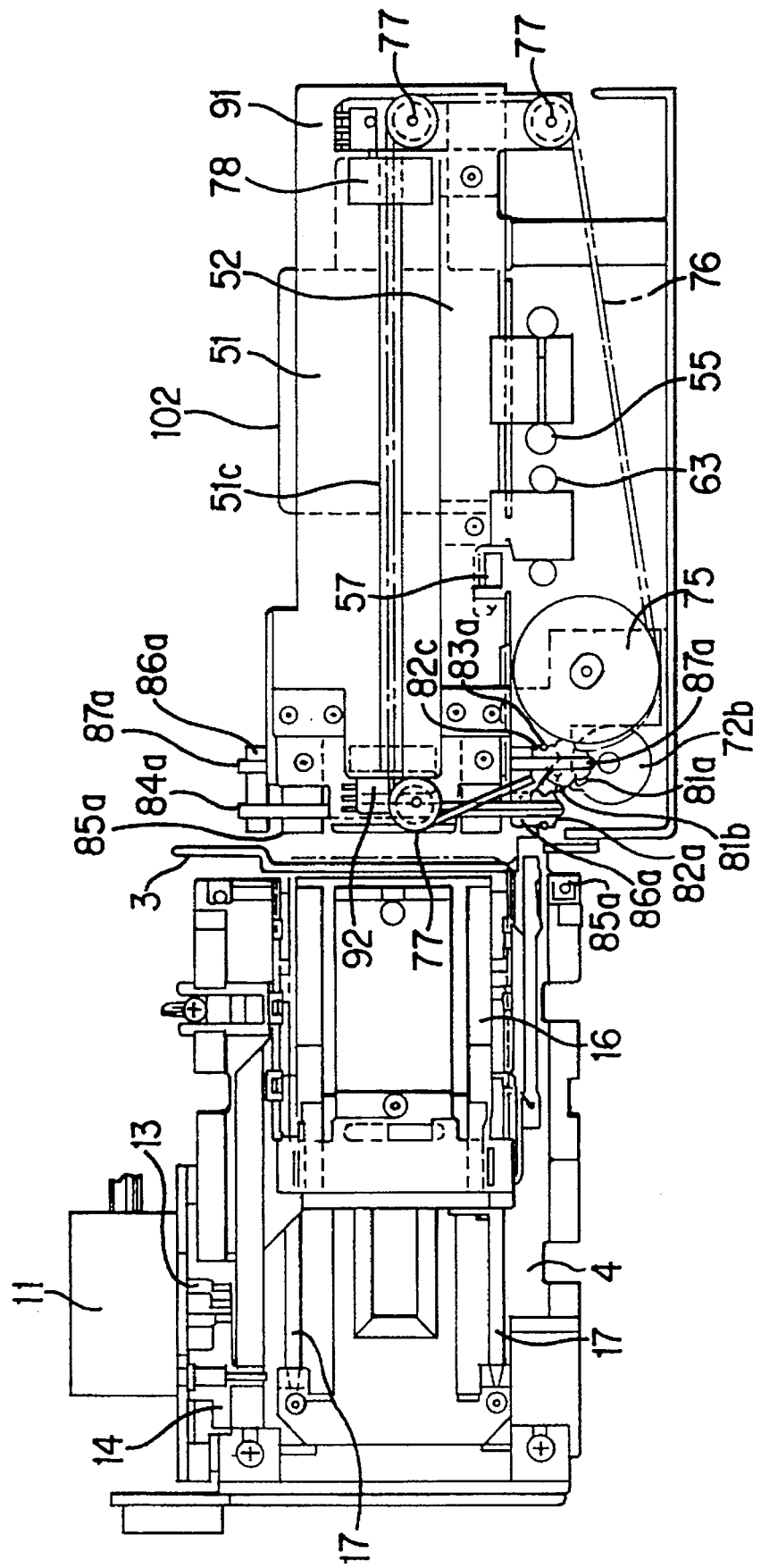
FIG. 7 is a cross-sectional side view of the feeder and the image input device along line 7—7 of FIG. 5.

The loading mechanism component is described hereafter with reference to FIGS. 6–8. A feeder motor 71 is attached to a feeder chassis 52. In an embodiment of the present invention, the motor 71 is a DC motor equipped with a speed-reducing gear head. A motor gear 72 is attached to the feeder motor 71. A flat gear component 72a of the motor gear 72 transmits the rotary driving force of the motor 71 to a speed-reducing gear 73. The rotary driving force of the speed-reducing gear 73 is transmitted to the belt pulley 75 via a friction spring 74. A conventional slip mechanism is used to eliminate unnecessary torque in the motor. A belt 76 is stretched around the belt pulley 75 via three idler pulleys 77 that are supported by the feeder chassis 52 so as to be able to rotate freely. A pushing plate 78 is attached to the belt 76 and slides within a slot 51c formed in the feeder block 51. The pushing plate 78 has a mount loading component 78a, extending from the feeder block 51 less than the minimum thickness of a film mount 102 as shown in FIG. 5. As shown in FIG. 6, an origin side limit switch 91 and a loading side limit switch 92 are attached to the feeder chassis 52 at opposite ends of the range of movement of the pushing plate 78. As shown in FIG. 7, a microswitch 57 is attached midway along the feeder block 51. If, for whatever reason, the film mount 102 stops or is blocked during the loading action, microswitch 57 detects that the film mount being loaded has disappeared.

The discharge mechanism component is described hereafter with reference to FIG. 6. A set of gear shafts 87a and 87b are supported by the feeder block 51 so as to rotate freely in a direction perpendicular to the direction of the shaft of the feeder motor 71. A bevel gear component 81a and a flat gear component 81b are attached to one gear shaft 87a. The bevel gear component 81a meshes with the bevel gear component 72b attached to the feeder motor 71. A flat gear component 81c is affixed to the gear shaft 87b having the same center of rotation. The flat gear components 81b and 81c are meshed together.

Levers 86a and 86b are attached at one end to the gear shafts 87a and 87b, respectively, such that the levers are capable of rotating around the shafts 87a and 87b. Roller shafts 84a and 84b are supported on opposite ends of the levers 86a and 86b. The roller shafts 84a and 84b rotate freely in parallel with the gear shafts 87a and 87b. Roller pulleys 82a and 82b are pressed onto one end of the roller shafts 84a and 84b, respectively, and have the same centers of rotation as the shafts. Rubber rollers 85a and 85b are attached by adhesive to the roller shafts 84a and 84b, respectively. It is acceptable to construct the rollers 85a and 85b with another elastic material, but rubber is preferable. Roller pulleys 82c and 82d are pressed onto the gear shafts 87a and 87b. Circular belts 83a and 83b are stretched around roller pulleys 82a and 82c and around roller pulleys 82b and 82d, respectively.

Figure 10A:
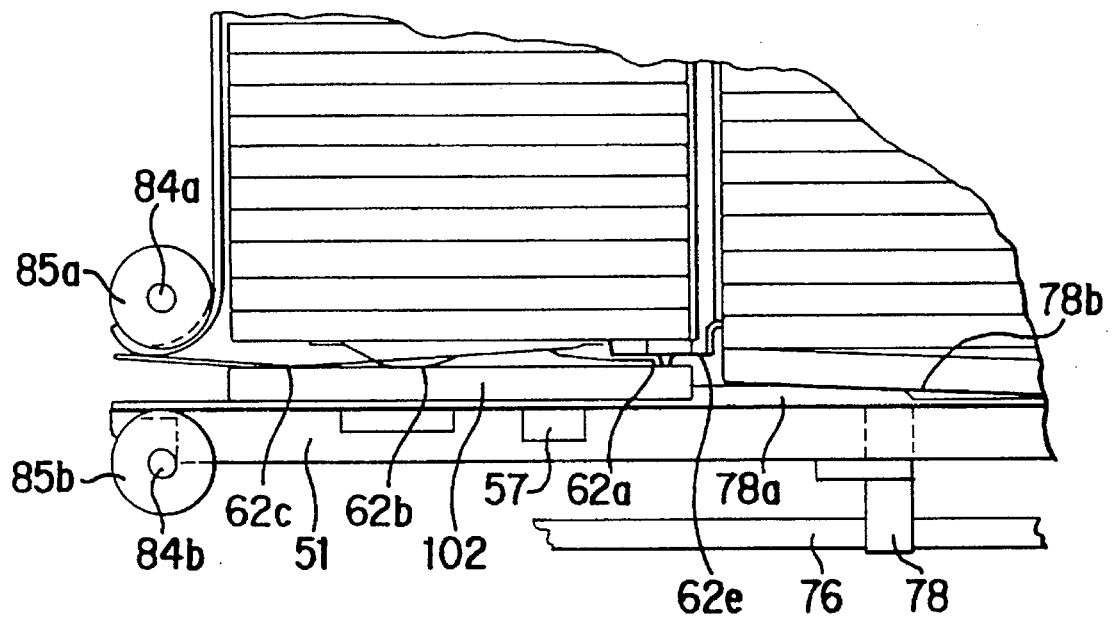
FIGS. 10(a) and 10(b) are plan views depicting the movement of the film mount and the separating spring in the discharge magazine component.
Figure 11A:
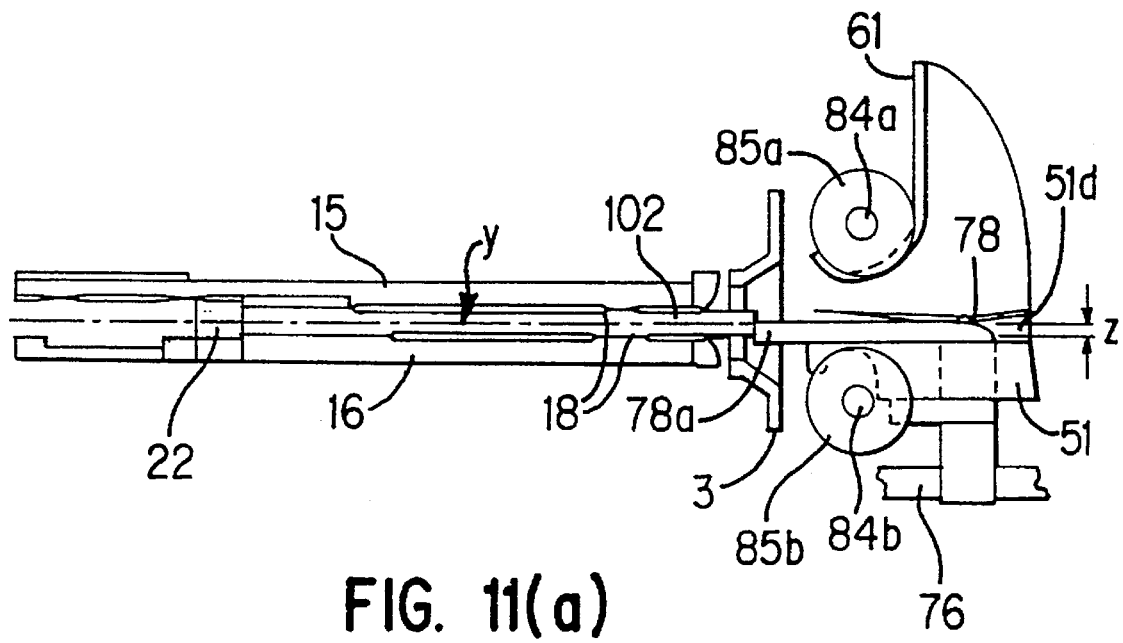
FIG. 11(a) is a plan view depicting the position of the focus direction of the carriage during loading of the film mount.

A series of loading actions is described hereafter with reference to FIGS. 10(a) and 11(a). When the feeder motor 71 is rotated in a counter-clockwise direction as viewed from the direction indicated by arrow a in FIG. 6, the pushing plate 78 moves in the loading direction. The film mount 102 inserted into the loading magazine 53 is pushed in the loading direction by the pushing plate 78. Since the amount of separation of the mount pushing component 78a of the pushing plate 78 from the feeder block 51 is less than the minimum thickness of a film mount 102, only one film mount 102 should be pushed. However, there are cases in which two or more film mounts are pushed by the force of friction. When this occurs, the top film mount 102 catches on the separating component 62a of the separating spring 62, separating the two film mounts.

As shown in FIG. 10 (a), the film mount 102 contacts and pushes up the arm component 62b of the separating spring. This presses the film mount 102 against the feeder block 51 such that the film mount 102 can be reliably loaded by the pushing plate 78. The film mount 102 is also pressed against the feeder block 51 by separating component 62c. With this arrangement, the film mount 102 from the feeder can be reliably advanced by the pushing plate 78 until the film mount 102 is completely pushed out. The front end of the arm component 62b pushes the discharged film mount 102 into the discharge magazine 61. The film mount 102 discharged from the image input device is horizontally leveled by the arm component 62b, as shown in FIG. 10(a). This leveling operation during the discharge action of the auto-feeder can be carried out smoothly.

The film mount 102 pushed from the feeder is stored in the carriage component of the image input device described previously. The front edge of the pushing plate 78 extends beyond the feeder block 51 as shown in FIG. 11a so that the film mount 102 reaches the film mount position of the carriage component. The pushing plate 78 extends beyond the feeder block since the loading and discharge openings of the auto-feeder and the carriage component of the image input device cannot be located in close proximity due to the front panel 3. When the pushing plate 78 activates the loading side limit switch 92, the feeder motor 71 stops, and the loading action is completed. The pushing plate 78 is sized such that the pushing plate 78 activates the loading side limit switch 92 when the film mount 102 contacts the ejection plate 22 of the image input device.

Prior to film mount insertion, the carriage component is moved in the focus direction to the approximate center of the adjusting width using the focus adjustment mechanism. Since the film mount 102 is sent along the feeder block 51, as shown in FIG. 11(a), it is desirable for the carriage component to be approximately parallel to the feeder block 51. As previously described, the carriage component is constructed so as to hold the film mount 102 between two plate springs 18. With such an arrangement, the film mount 102 will be reliably forced to the center of the carriage component, even when the film mount thickness varies. As shown in FIG. 11a, the central position (y) of the carriage component is arranged in a position that is shifted approximately half the minimum mount thickness (z) relative to the film conveying surface 51d of the feeder block 51 of the auto-feeder. In a present embodiment, the shift amount is about 0.6 mm. When the thickness of the film mount 102 is changed, the film mount 102 can be reliably stored in the carriage component because the film mount 102 and the pushing plate 78 do not shake.

The rubber rollers 85 rotate about the shafts 87 during the loading action. The frictional rotary force of the roller pulley 82 and the lever 86 cause the rollers 85 to separate. Thus, the loading action is accomplished by the pushing plate 78. The rubber rollers 85 do not contribute to the loading action.

Figure 10B:
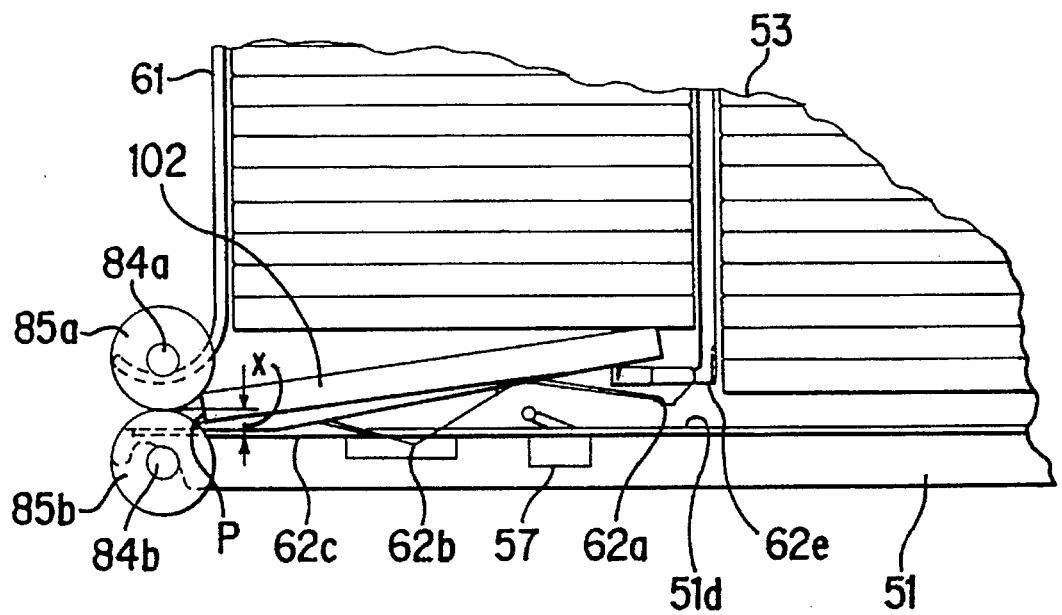
Figure 11B:
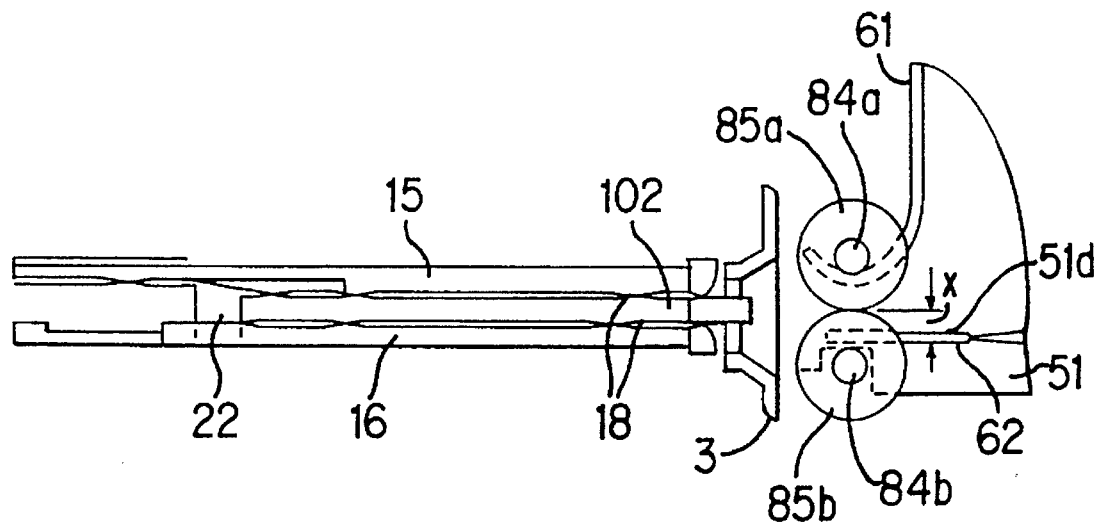
FIG. 11(b) is a plan view depicting the position of the focus direction of the carriage during discharging of the film mount.

A series of discharge actions is described hereafter with reference to FIGS. 10(b) and 11(b). The focus direction position is first moved using the AF mechanism until the center of the carriage component roughly matches the center of the rubber rollers 85. This counteracts any shift in the position of the film mount in the focus direction when focusing is performed. Furthermore, this prevents the ejected film mount 102 from striking the feeder block 51 because the discharge action would not proceed if the film mount strikes the feeder block. The feeder is arranged so as to shift the centers of the two sets of rollers 85a and 85b and the film conveying surface 51d. The shifting amount (x) is approximately equal to or greater than half the maximum film mount thickness. In a present embodiment, the shifting amount x is about 1.6 mm. By moving the position of the focus direction with the AF mechanism until the center of the carriage component roughly corresponds to the center of the two sets of rubber rollers 85a and 85b, the film mount 102 can reliably engage the rubber rollers.

The film mount 102 is ejected from the image input device to a position where the film mount 102 is held between the rubber rollers 85 when the rubber rollers 85a and 85b close. When the feeder motor 71 rotates in the clockwise direction, as viewed from the direction shown by arrow a in FIG. 6, the pushing plate 78 moves in the direction of origin. When the front edge of the pushing plate 78 does not extend beyond the feeder block, the ejection action of the image input device and the discharge action of the auto-feeder are approximately synchronized so that the front end of the ejected film mount 102 is held between the rubber rollers 85a and 85b. The main base plate 5 of the image input device and the feeder motor 71, limit switches 91 and 92, and microswitch 57 of the auto-feeder are electrically connected, and are regulated by the central processing unit (CPU) 113 on the main base plate 5, shown in FIG. 12.

The rubber rollers 85a and 85b are rotated about the shafts 87a and 87b in directions that bring the rollers close together through the frictional force of the roller pulleys 82 and the levers 86. The rubber rollers 85 press and hold the film mount 102. The rotation of the rollers pulls the film mount 102 to the auto-feeder. The film mount 102 is stored in the discharge magazine 61 alongside the separating spring 62. As previously described with reference to the loading action, the arm component 62b of the separating spring 62 maintains the film mounts in a horizontal position within the discharge magazine, as shown in FIG. 10(a). As a result, a newly discharged film mount 102 will not run into the edge surface P, shown in FIG. 10(b), of a film mount inside the discharge magazine 61, preventing discharge of the film mount. Additionally, the mount restraining plate 54 within the discharge magazine 61 and the horizontal component of the separating spring 62 assist in maintaining the discharged film mounts in a horizontal position and in preventing any hindrance of the discharge action.

When the pushing plate, shown in FIG. 6, activates the origin side limit switch 91, the feeder motor 71 stops and the discharge action is completed. The origin side 78b of the pushing component 78a of the pushing plate 78 has a slanted surface. The film mount 102 in the loading magazine 53 and the pushing plate 78 do not collide as the pushing plate returns to the original position because the film mount in the loading magazine slides along the slanted surface. In the original position, the pushing plate activates the origin side limit switch 91.

The film mounts 102 may jam if the loading action is repeatedly carried out. Therefore, it is necessary to control the issuance of a loading action command. The memory of the host computer or image input device is used to control the loading action. When a loading action command is issued, the command is stored in the memory. The command is stored until a discharge action command is issued and may be set to clear upon the discharge action command. When a loading action command is input while a loading action command is stored in the memory, the host computer or image input device will display an error message, and the command will not be executed.

In an image input device according to an embodiment of the present invention, the film mount loading opening and the discharge opening are in the front surface. The source document of the film mount is scanned from the front surface toward the interior of the image input device. The auto-feeder is arranged such that the magazine component is roughly perpendicular to the loading opening. The loading magazine component and the discharge magazine component are adjacent. The pushing plate 78 carries out the loading action. The discharge action is carried out by the rollers 85.

The electrical connections of each component provided on the main body 111 of the image input device and the auto-feeder 112 are discussed in connection with FIG. 12. A central processing unit (CPU) 113 is located on the main base plate 5. The stepping motor 11 of the image input device is connected to the CPU 113 via a first motor driver circuit 114. The LED block 37 is connected to the CPU 113 via an LED driver circuit 115. The CCD 43 is driven by the CPU 113 via a timing generating circuit 116. The output from the CCD 43 is transmitted to the CPU 113 via the preface amplifier 117 and the A/D converter 118. The photo sensor 48 and the limit switch 49 are each connected to the CPU 113. The AF motor 31 is connected to the CPU 113 via a second motor driver circuit 119.

The microswitch 57, the origin side limit switch 91, and the loading side limit switch 92 located within the auto-feeder 112 are each connected to the CPU 113 via connectors 120, 121 and 122, respectively. The feeder motor 71 is connected to the CPU 113 via connector 123 and a thin motor driver circuit 124. The CPU 113 is connected to a host computer 127 via an image input device side interface 125 and a host computer side interface 126. A memory 128 is provided between the CPU 113 and the interface 125 for storing commands sent from the host computer 127 and various data from inside the image input device.

The sequence of the principal operations of the present embodiment is described with reference to the figures. When the power supply is connected, the CPU confirms whether a film mount 102 is already in the image input device 111. If a film mount 102 is in the image input device 111, the film mount 102 is ejected, and the auto-feeder performs the film mount discharge action. This prevents a subsequent film mount 102 from erroneously being inserted. Additionally, this prevents damage or breakdown of the film mount 102, the image input device and the auto-feeder. Errors associated with the loading action after the connection of the power supply are also prevented. The pushing plate 78 is returned to the original position when the film mount 102 is discharged from the image input device 111. The pushing plate 78 moves in the original position direction regardless of the position of the pushing plate 78.

After connection of the power source, the pushing plate 78 may possibly be stopped in an unfixed position. The unfixed position may be detected by the CPU. When a film mount 102 remains inside the image input device 111, the film mount 102 will be reliably removed during the normal discharge action of a fixed time interval. The time interval corresponds to the time interval required for the pushing plate 78 to move from the origin side limit switch 91 to the loading side limit switch 92. In the present embodiment, the fixed time interval is 10 seconds. Depending upon the location of the pushing plate 78 at the time of the power supply connection, the pushing plate 78 may return to the original position before the fixed time interval has expired. The pushing plate 78 then actuates the origin side limit switch 91 and reaches the limit of the feeder chassis 52. At this point, the movement of the pushing plate 78 is restricted. A slip mechanism is provided on the belt component 76 that drives the pushing plate 78 for avoiding damage to the belt component 76 when the pushing plate 78 returns to the original position prior to expiration of the fixed time interval.

The image input device may not be equipped with an auto-feeder. The CPU 113 determines whether an auto-feeder is installed. This can be accomplished by providing joint components such as, for example, connectors 120–123 that electrically connect the main base plate 5 of the image input device 111 and to auto-feeder 112. When the image input device and the auto-feeder are connected, a signal passes through the joint components. If an auto-feeder is not installed, the detection of a film mount inside the main body of the image input device 111 will not be performed when the power supply is connected. When the film mount 102 is discharged, the movement of the carriage component of the image input device 111 does not have to be synchronized with the auto-feeder discharge action commencement position. Thus, the discharge time is shortened when an auto-feeder is not installed.

Figure 13A:
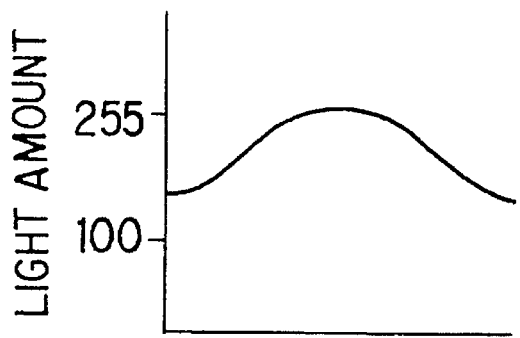
FIGS. 13(a)–(c) are examples of the data read by the CCD.
Figure 13B:
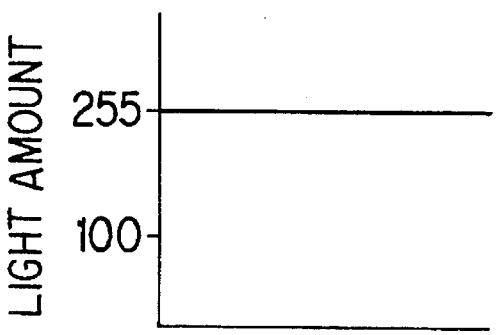

The CPU 113 can confirm the presence of a film mount in the image input device. The carriage component is moved in the secondary scanning direction, and one line of data of the CCD 43 in the image reading aperture position is read. This data is compared with light amount data previously stored, such as, for example, that shown in FIG. 13(a). This light amount data may also use light amount data that has been shading corrected, such as, for example, that shown in FIG. 13(b). If the data and the light amount data are the same, no film mount 102 is present. When the data and the light amount data are different, a film mount 102 is present within the image input device.

The method of comparing the light amount data and the data within the image reading aperture position calculates and compares each integral value of both data. When the values are approximately the same, a film mount 102 is not present. Alternatively, the difference of each pixel for both data may also be calculated. When the difference is approximately zero, a film mount 102 is not present. The data of one line from within the image reading aperture position requires the same time to accumulate in the CCD 43 as when the light amount data was taken, and the data is data that has not required shading correction.

Alternatively, a film mount 102 can be detected using the outside of the aperture frame of the film mount 102. When one line of data from outside the aperture frame is taken, the value will be the same as in the shaded condition. The signal outputs of the CCD 43 in the portion outside of the aperture frame will all be zero or approximately zero, and it will be determined that a film mount 102 is present.

A base on the source document or film has a certain density. When a film mount is present, the CCD output at the beginning of the same accumulation interval of the CCD 43 will invariably drop when compared to the CCD output at the time of passing the elements. Using the source document or film portion of the film mount 102, a threshold value is set such that a certain CCD 43 output value will absolutely not be exceeded at the beginning of the accumulation interval when a film mount is present. The absence of a film mount 102 is detected when the threshold value is exceeded.

Figure 13C:
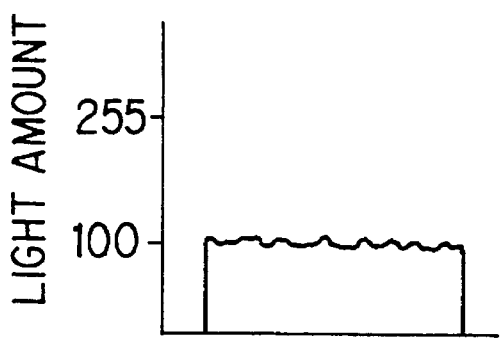

Alternatively, the presence of a film mount can be determined by comparing light receiving ranges. The light receiving ranges of the aperture of the carriage component and the CCD 43 are longer than the film mount aperture or the aperture in the film holder. When a film mount 102 is present in the image input device, the pixels in the vicinities of the positions at both ends of the CCD signals will be darkened, the pixel data will become 200 or approximately 200, as shown in FIG. 13(c), indicating the presence of a film mount 102.

Film mount jam detection will now be described. The film mount jam detection detects the operating condition of the microswitch 57 located at the center of the feeder block 51. The condition of the microswitch 57 is checked during power supply connection, during the loading action, and during the discharge action. When the switch is ON, it will be understood that there has been a problem during the previous loading action and that a film mount 102 remains in the loading path. If the next film mount 102 is loaded and discharged in this condition, the film mounts 102 will suffer damage. Therefore, an error message is generated in the main body side, and an error is indicated. When the microswitch 57 is not ON, the next film mount 102 may be loaded and discharged without hindrance.

During the loading action, the condition of the origin side limit switch 91 after jam detection is confirmed. This is because of the possibility that the user may move the pushing plate 78. If the origin side limit switch 91 is not ON, the pushing plate 78 will not be in the original position. In this state, the film mount 102 cannot be pushed even if the pushing plate 78 is moved in the loading direction. The feeder motor 71 at this point will rotate, moving the pushing plate 78 until the origin side limit switch 91 is depressed.

The detection of the end of loading film mounts will now be described. End detection (i.e., the loading magazine is empty) is performed throughout the loading action of the film mounts 102 according to the procedure described below. During the loading action, a film mount 102 is pushed by the pushing plate 78, and the microswitch 57 switches from OFF to ON and returns to the OFF condition. If, however, the switch 57 does not pass through these conditions, or in other words, if the loading side switch 92 is turned to ON when the origin side switch 91 is still OFF, then a film mount 102 has not been fed, and the loading magazine is empty.

When an empty loading magazine is detected, the pushing plate 78 is moved to a position such that the loading side limit switch 92 is turned ON. The action of the feeder motor 71 stops. The action at the time of the detection of the end of the mounts uses this action as the final action and then stops. If the pushing plate 71 is stopped on the loading side when the action is completed, an initial action to move the pushing plate 78 to the origin side is not necessary in the case that a film mount 102 is not present in the image input device 111 when the power supply is connected, and the initialization interval can be shortened. When film is present within the image input device 111, if a slip mechanism is set up on the driving mechanism of the pushing plate 78, a discharge action of a fixed time interval, such as, for example, ten seconds may be performed when the pushing plate 78 is at the origin side. The film mount 102 can be discharged from the image input device 111.

When the image processing of a film mount 102 currently loaded in the image input device 111 is complete, a selection can be made using, for example, the host computer 127 for determining when the sequence is to end. The sequence can end with the film mount 102 remaining in the main body or after the film mount 102 is discharged. If the film mount 102 is to remain in the main body, the pushing plate 78 moves to the origin side and stops without carrying out the discharge action. If the film mount 102 is to be discharged, the image input device 111 and the feeder 112 carry out the discharge action. The pushing plate 78 then moves to the origin side and stops. The latter is effective when it is desired to perform image processing again on the same film when the power supply is reconnected. In this case, the presence or absence of film is detected at the time of the power supply connection, and a forced discharge action is not carried out.

Alternatively, the detection of the end of the film mounts 102 may also be carried out using a contact sensor within the loading magazine component. When the loading magazine is empty, no further loading or discharge actions are performed. Thus, endless wasteful actions during times of unmanned operation can be prevented.

The operating sequence of the image input device 111 and auto-feeder 112 according to the present embodiment will be described with reference to the flow charts shown in FIGS. 14–27. FIGS. 14–17 depict flow charts for the movement sequence in the secondary scanning direction of the carriage 15 of the image input device 111. As shown in FIG. 17, the carriage 15 moves in the film mount discharge position direction as indicated, for example, as address 0 in FIG. 17 by rotation of the stepping motor 11 in the clockwise direction, and moves in the reading completion position direction as indicated, for example, as by rotating the motor in the counterclockwise direction. Address 1 is located between addresses 0 and 5 and corresponds to the film mount loading position. Address 2 corresponds to the position where the photo sensor 48 turns ON. Shading correction is carried out at address 2. Address 3 corresponds to the film mount 102 image reading commencement position. Address 4 corresponds to the auto-feeder discharge action commencement position when the film mount 102 is discharged. Address 4 also corresponds to the AF origin detection position.

Figure 14:
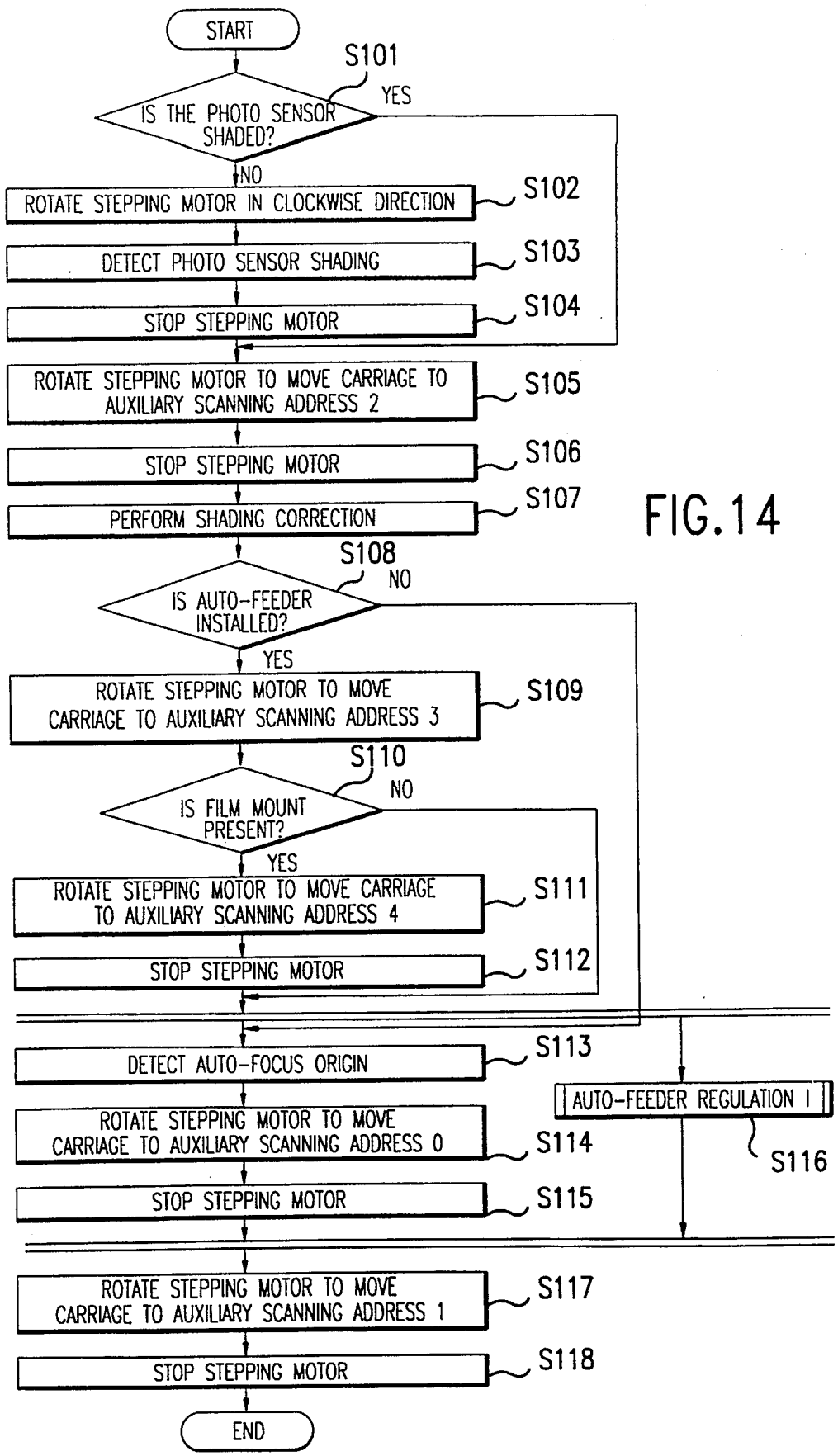
FIG. 14 is a flow chart depicting the operating sequence of the secondary scanning carriage when the power source is connected.

FIG. 14 is a flow chart depicting the operation of the image reading device and feeder for the connection of the power supply. In step S101, the CPU 113 determines whether the photo sensor 48 is shaded by the arm component 15a on the carriage 15. When shading is detected in step S101, the operation of the CPU 113 proceeds to step S105. When the photo sensor 48 is not shaded, the operation of the CPU proceeds to step S102 where the stepping motor 11 is rotated in the clockwise direction. In step S103, the shading of the photo sensor 48 is again detected. When shading is detected, the operation of the CPU proceeds to step S104 where the rotation of the stepping motor 11 is stopped. In step S105, the stepping motor 11 is rotated to move the carriage 15 to the secondary scanning address 2, shown in FIG. 17. The rotation of the stepping motor is stopped in step S106. In step S107, shading correction is performed.

After shading correction is completed in step S107, the CPU 113 determines in step S108 whether an auto-feeder 112 is installed on the main body of the image input device 111. When the auto-feeder 112 is not installed, the operation of the CPU proceeds directly to step S113 and carries out the operations of steps S114, S115, S117 and S118. When an auto-feeder 112 is installed, the stepping motor 11 is rotated in step S109 to move the carriage 15 to the secondary scanning address 3 shown in FIG. 17. In step S110, the presence of a film mount 102 in the carriage 15 is detected. If a film mount 102 is present, the carriage 15 in step S111 moves to secondary scanning address 4, and the rotation of the stepping motor 11 stops in step S112.

If a film mount 102 is not detected in step S110, the operation of the CPU proceeds to step S113. Steps S113–S115 are carried out in parallel with step S116, regardless of whether a film mount 102 is present. In step S113, the carriage 15 moves to the AF origin position corresponding to secondary scanning address 4, and the auto-focus origin is detected by the AF motor 31. In step S114, the carriage 15 is moved to the film mount discharge position, corresponding to the secondary scanning address 0. In step S115, the movement of the carriage 15 stops. In step S116, an auto-feeder regulation I (described hereafter) is performed. In step S117, the carriage 15 is moved to the film mount loading position corresponding to secondary scanning address 1. The rotation of the stepping motor 11 stops in step S118.

Figure 15:
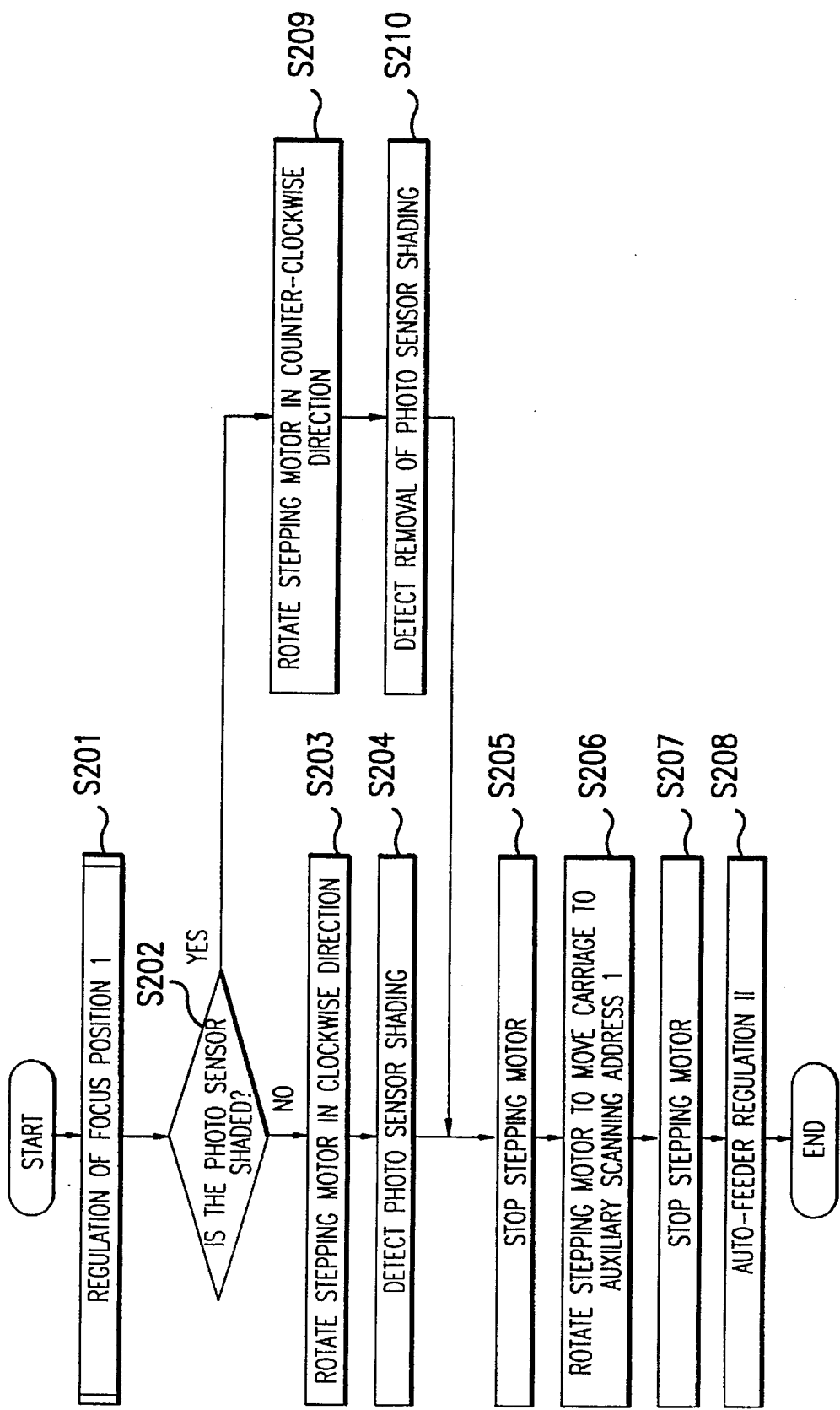
FIG. 15 is a flow chart depicting the operating sequence of the secondary scanning carriage when the film mount is loaded.

FIG. 15 is a flow chart depicting film loading when an auto-feeder is attached to the image reading device. In step S201, a regulation of the focus position I that changes the height of the optical axis direction of the carriage 15 is performed. In steps S202–S205, the operations performed are the same as steps S101–S104 of the power supply connection. In step S206, the carriage 15 is moved to secondary scanning address I by rotation of the stepping motor 11. In step S207, the rotation of the stepping motor is stopped. In step S208, an auto-feeder regulation II (described hereafter) is performed.

When the CPU detects in step S202 that the photo sensor 48 is shaded, the operation of the CPU proceeds to step S209. In step S209, the stepping motor 11 rotates in the counter-clockwise direction. In step S210, the CPU detects that the shading has been removed from the photo sensor 48. In step S205, the rotation of the stepping motor 11 stops, and the origin of the secondary scanning direction of the carriage is detected.

Figure 16:
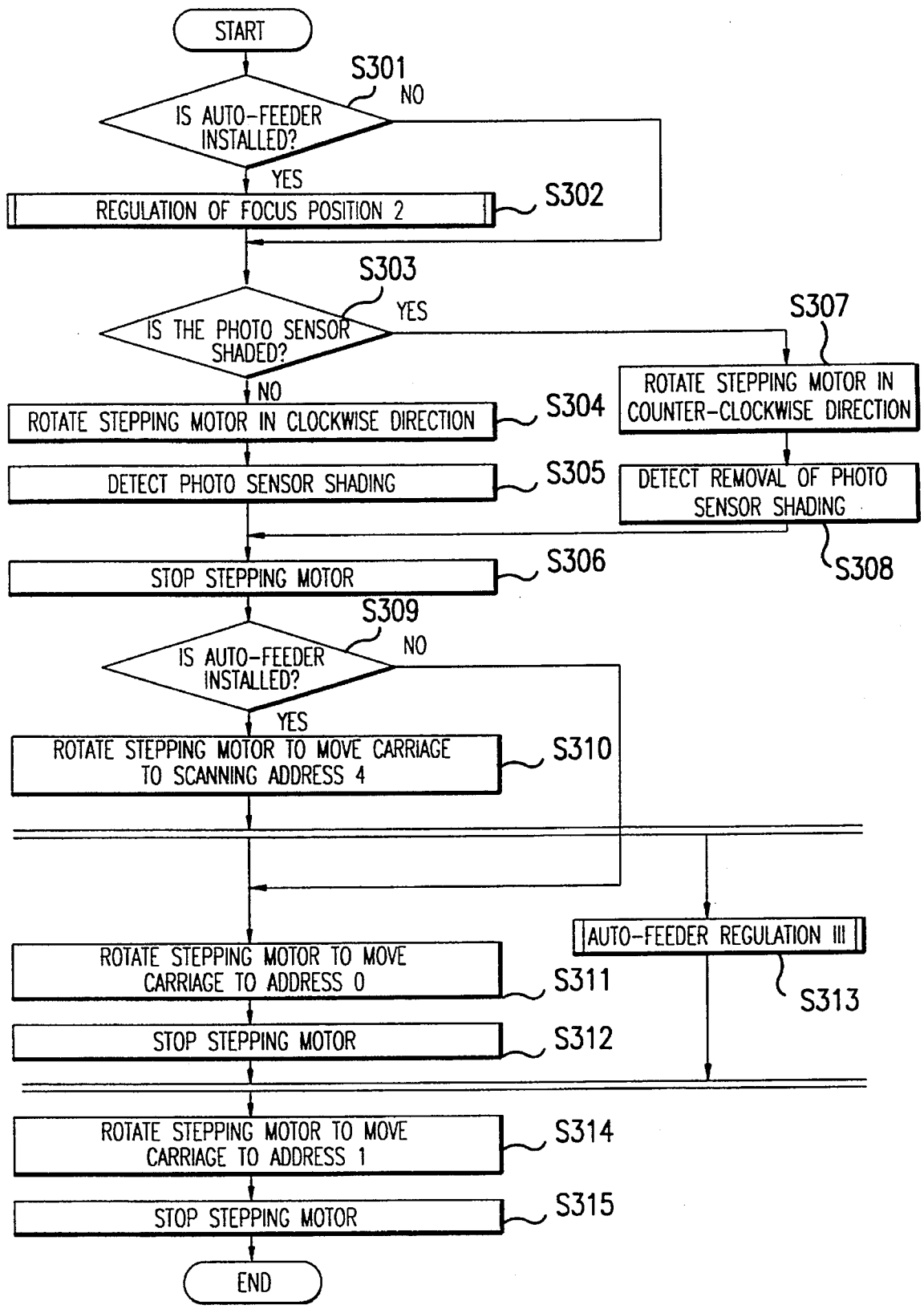
FIG. 16 is a flow chart depicting the operating sequence of the secondary scanning carriage when the film mount is discharged.
Figure 17:
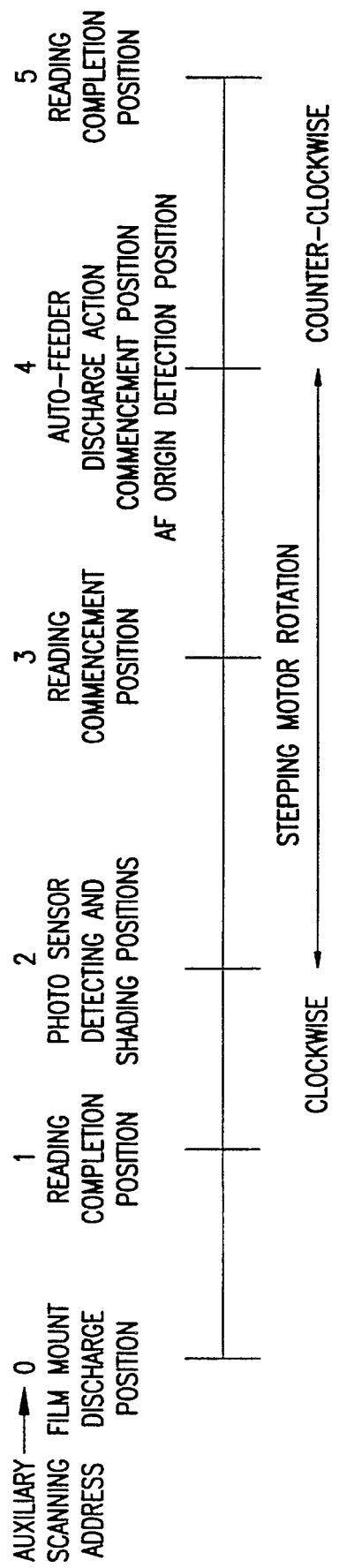
FIG. 17 is a flow chart depicting the addresses of the secondary scanning carriage.

FIG. 16 is a flow chart of the film discharge. In step S301, the CPU 113 detects whether an auto-feeder 112 is installed on the main body of the image input device 111. When an auto-feeder 112 is installed, regulation of focus position 2 (described hereafter) is performed in step S302. When an auto-feeder 112 is not installed, this regulation is not performed, and the operation of the CPU proceeds to step S303. The operations of the following steps S303, S304 and S305 are the same as the operations of steps S101, S102 and S103 of the power supply connection, and the operations of steps S306, S307 and S308 are the same as the operations of steps S205, S209 and S210 of the film loading operation.

In step S306, the rotation of the stepping motor 11 is stopped. In step S309, the CPU detects whether an auto-feeder 112 is installed. When an auto-feeder 112 is installed, the carriage 15 is moved to secondary scanning address 4 by the stepping motor 11 in step S310 to synchronize the actions of the image input device 111 and the auto-feeder 112. In step S311, the carriage 15 is moved to secondary scanning address 0 by the stepping motor 11. In step S312, the rotation of the stepping motor 11 is stopped. Simultaneously, in step S313, an auto-feeder regulation III (described hereafter) is performed. In step S314, the carriage 15 is moved to secondary scanning position I by the stepping motor 15. In step S315, the rotation of the stepping motor 11 is stopped, and the operation of the CPU waits for the insertion of the next film mount 102.

Figure 19:
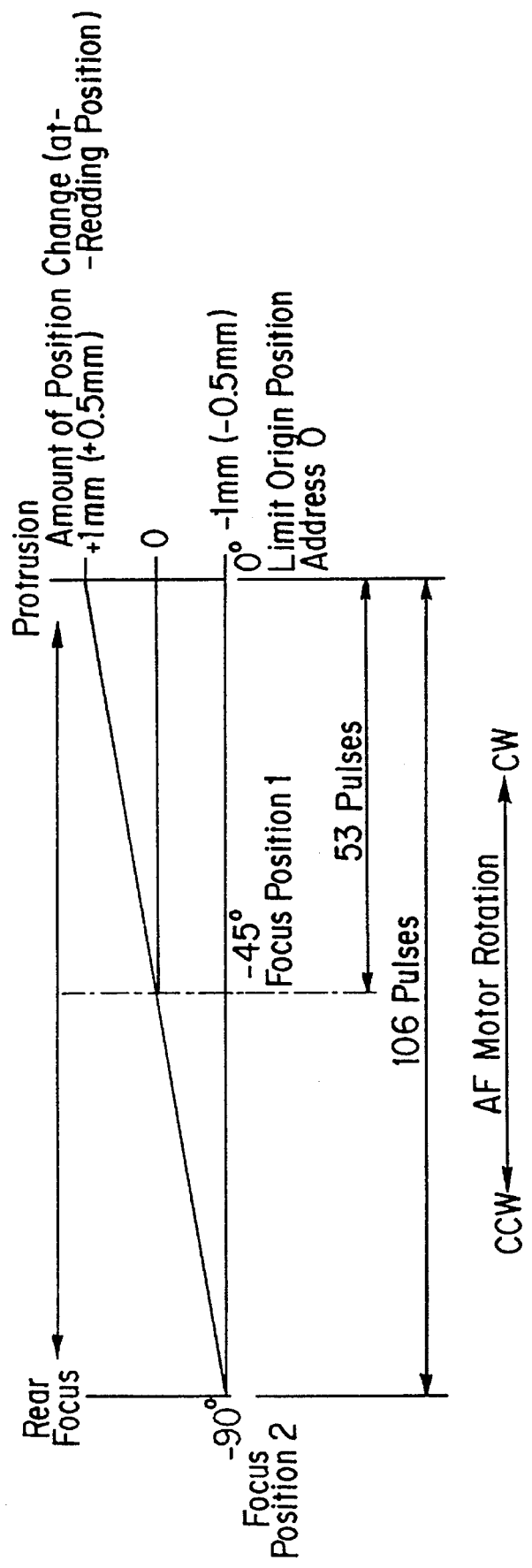
FIG. 19 is a graph depicting the auto-focus positions.

FIGS. 18(a)–(c) are flow charts depicting the action sequence of the auto-focus mechanism in the image input device 111. FIG. 19 is a line drawing depicting the relationship of the rotation of the AF motor 31 to the different positions of the focus cam 27. In FIG. 19, the angle of rotation of the focus cam 27, shown in FIG. 1, is 0 degrees when the protruding component 27c formed on the side surface 27b of the focus cam 27 turns on the limit switch 49. At this point, the position that the protruding component 25b of the focus blocks 25 contacts the cam surface 27a is the origin. The position where the protruding component 25b contacts the cam surface 27a when the focus cam 27 is rotated forty-five degrees in the counter-clockwise direction by the AF motor 31 is focus position 1. Focus position 2 corresponds to the position where the cam 27 is rotated ninety degrees. The rotation of the AF motor 31 rotates the focus cam 27 from the origin position to focus position 1. This occurs in 53 steps of the AF motor 31. The rotation of the focus cam 27 to focus position 2 occurs in 106 steps of the AF motor 31. When the amount of position difference in the optical axis direction of the protruding component 25b in focus position 1 is taken to be 0, the amount of position difference of the origin position is +1 mm, and the amount of position difference in focus position 2 is −1 mm. As described above, the amounts of position difference in the reading position are +0.5 mm and −0.5 mm, respectively.

FIG. 18(a) is a flow chart depicting the auto-focus origin detection operation when the power supply is connected. In step S401, the CPU 113 detects whether the limit switch 49 is ON. If the switch 49 is ON, the AF motor 31 is rotated fifty pulses in the counter-clockwise direction in step S402. The rotation of the AF motor 31 then stops in step S403. In step S404, the operation of the limit switch 49 is determined. When the switch 49 is OFF, the operation of the limit switch 49 is normal. In step S405, the AF motor 31 is rotated in the clockwise direction. In step S406, the limit switch 49 is detected to be ON. In step S407, the AF motor 31 stops rotating. When the limit switch 49 is ON in step S404, the operation of the limit switch 49 is abnormal. In step S408, an error is displayed. When the limit switch 49 is OFF in step S401, the operation of the CPU 113 proceeds to step S405.

FIG. 18(b) is a flow chart depicting the regulation of focus position 1 performed when the film is loaded. In step S501, the AF motor 31 is rotated 53 pulses from the focus address 0 in the counter-clockwise direction, and the focus cam 27 is moved to focus position 1, shown in FIG. 19. The rotation of the AF motor 31 then stops in step S502.

FIG. 18(c) is a flow chart depicting the regulation of focus position 2 performed when the film is discharged. In step S601, the AF motor 31 is rotated in the counter-clockwise direction 106 pulses from the focus address 0, and the focus cam 27 is moved to the focus position 2, shown in FIG. 19. The rotation of the AF motor 31 then stops in step S602.

Figure 20:
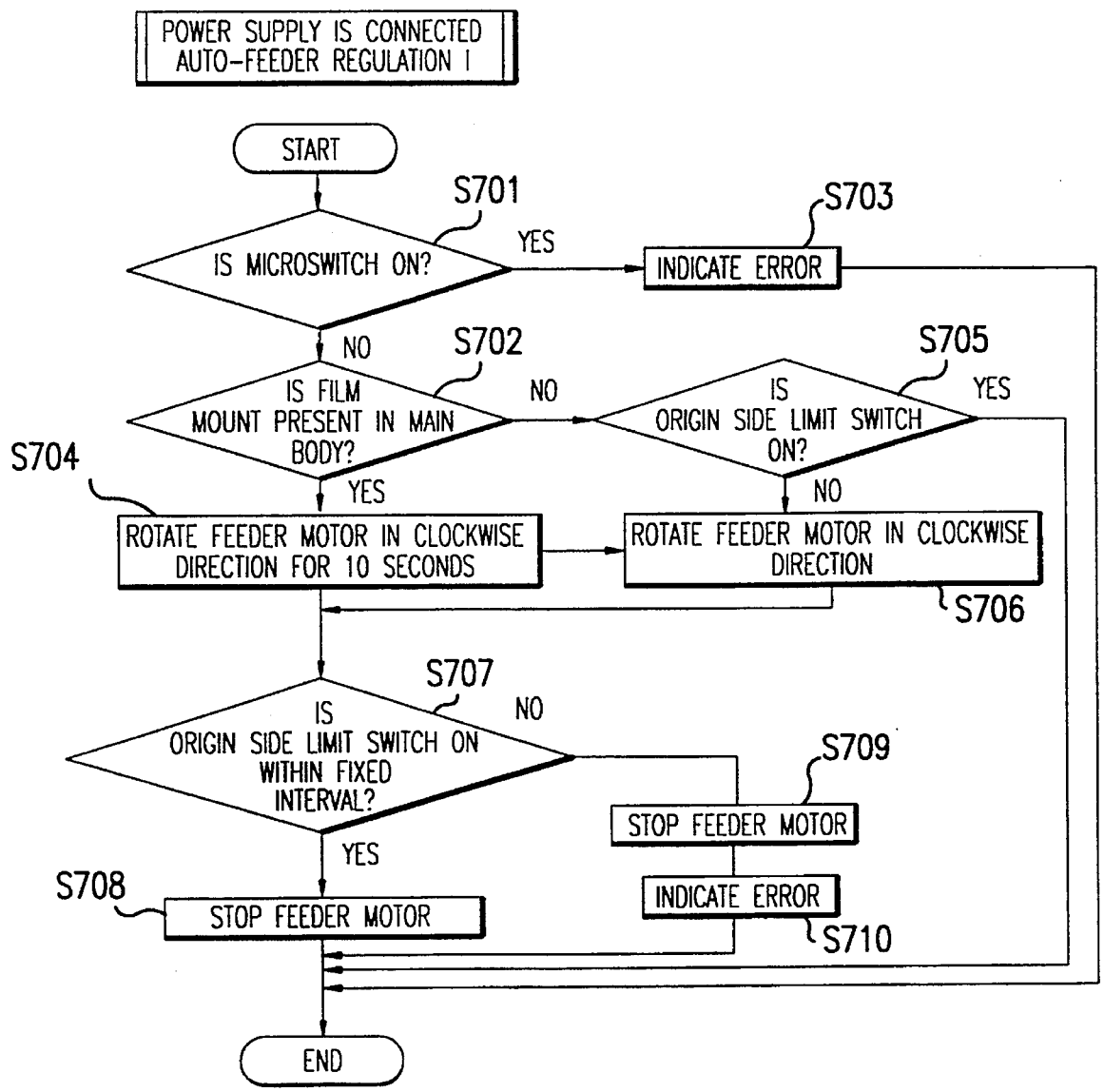
FIG. 20 is a flow chart depicting the regulating operating sequence of the auto-feeder when the power supply is connected.

FIGS. 20–27 are flow charts depicting the operating sequence of the auto-feeder 112. FIG. 20 is a flow chart depicting the auto-feeder regulation I when the power supply is connected. In step S701, the operating state of the microswitch 57 in the film conveyance path 51d is detected. When the microswitch 57 is OFF, the CPU 113 determines whether a film mount 102 is present within the main body of the image input device 111, as discussed previously. When the microswitch 57 is ON, a film mount 102 remains in film conveyance path 51d. An error is then indicated in step S703.

When a film mount 102 is detected in step S702, the feeder motor 71 is rotated in the clockwise direction for a period such as, for example, 10 seconds in step S704, and the film mount 102 is discharged. When a film mount 102 is not detected in step S702, the CPU determines in step S705 whether the origin side limit switch 91 is ON. When the origin side limit switch 91 is ON, the operation ends because the pushing plate 78 is at the origin position. When the limit switch 91 is OFF, the feeder motor 71 rotates in the clockwise direction in step S706, and the pushing plate 78 moves in the origin direction. The pushing plate 78 then returns to the initial state.

In step S707, the CPU determines whether the origin side limit switch 91 is ON when the feeder motor 71 is rotated in steps S704 and S706. If the switch 91 is ON, the rotation of the feeder motor 71 stops in step S708, and the operation ends. If the switch 91 is OFF even though the feeder motor 71 has been rotated for a fixed interval (such as 10 seconds), the CPU determines in step S709 that an error such as breakdown of the switch 91 or the like has occurred. The rotation of the feeder motor 71 is stopped. In step S70, an error is indicated.

Figure 21:
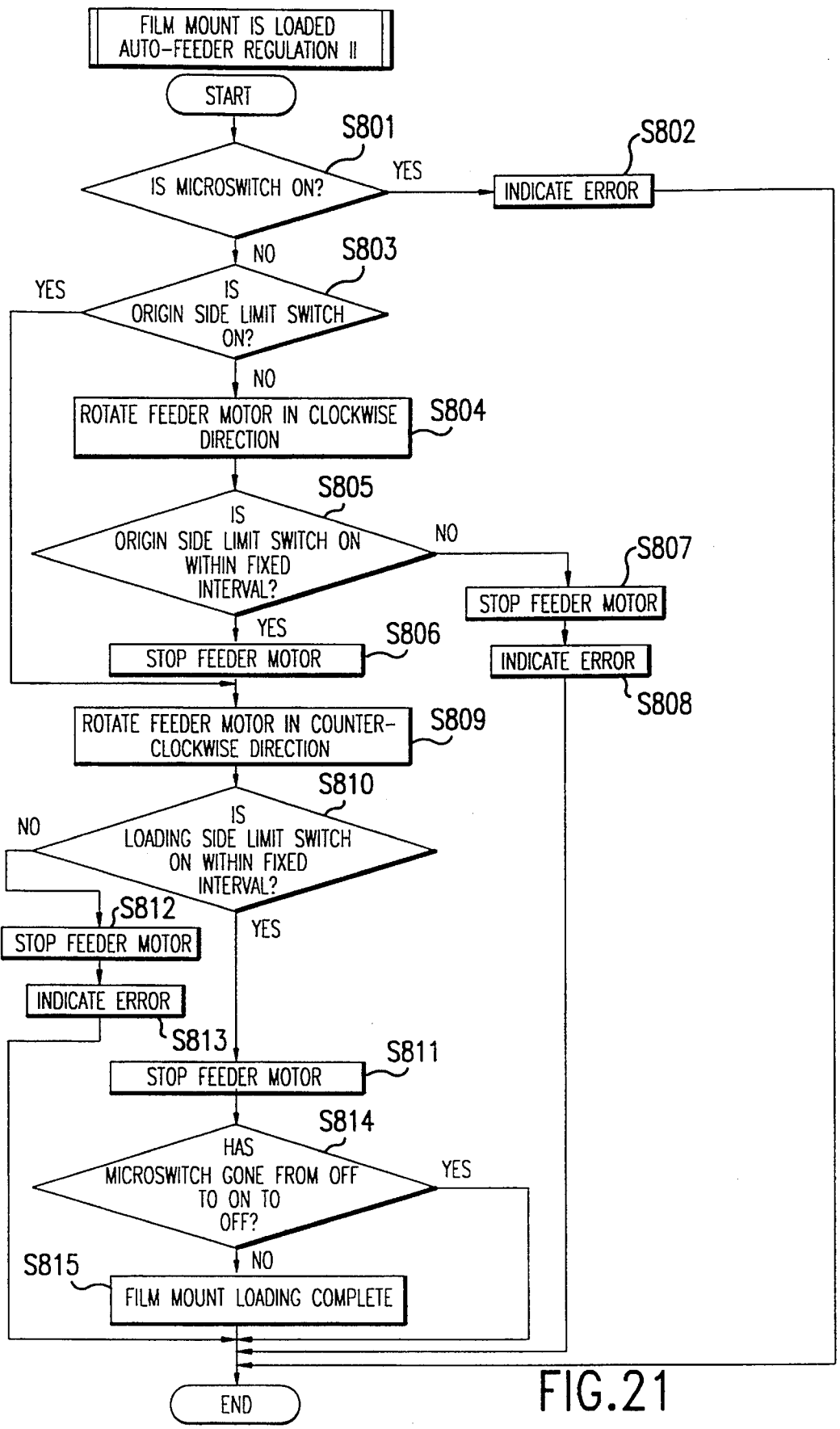
FIG. 21 is a flow chart depicting the regulating operating sequence of the auto-feeder when the film mount is loaded.

FIG. 21 is a flow chart depicting the auto-feeder regulation II at the time of film loading. In step S801, a determination is made as to whether the microswitch 57 is ON or OFF. When the microswitch 57 is ON, an error is indicated in step S802, and the operation ends. If the microswitch 57 is OFF, the CPU determines in step S803 whether the origin side limit switch 91 is ON. If the limit switch 91 is OFF, the feeder motor 71 rotates in the clockwise direction in step S804, and the pushing plate 78 moves in the origin direction. In steps S805, S806, S807 and S808, the same operations are performed as in steps S707, S708, S709 and S710 of the auto-feeder regulation I.

When the origin side limit switch 91 is ON in step S803, the rotation of the feeder motor 71 stops in step S806. When the pushing plate 78 arrives at the origin position, the feeder motor 71 rotates in the counter-clockwise direction in step S809, and a film mount 102 is inserted by the pushing plate 78. In step S810, after an inserting action of 10 seconds or less, the CPU determines whether the loading side limit switch 92 is ON or OFF. When the limit switch 92 is ON, the rotation of the feeder motor 71 stops in step S811. When the limit switch 92 is OFF, the rotation of the feeder motor 71 stops in step S812, and an error is indicated in step S813. When the rotation of the feeder motor 71 stops in step S811, the CPU determines in step S814 whether the microswitch 57 has gone from OFF to ON to OFF during the movement of the pushing plate 78. If so, the CPU determines in step S815 that loading film is gone from inside the loading magazine 53, and the operation ends. In the present embodiment, the microswitch 57 is used as a detection switch, however, a photo sensor or the like may also be used.

Figure 22:
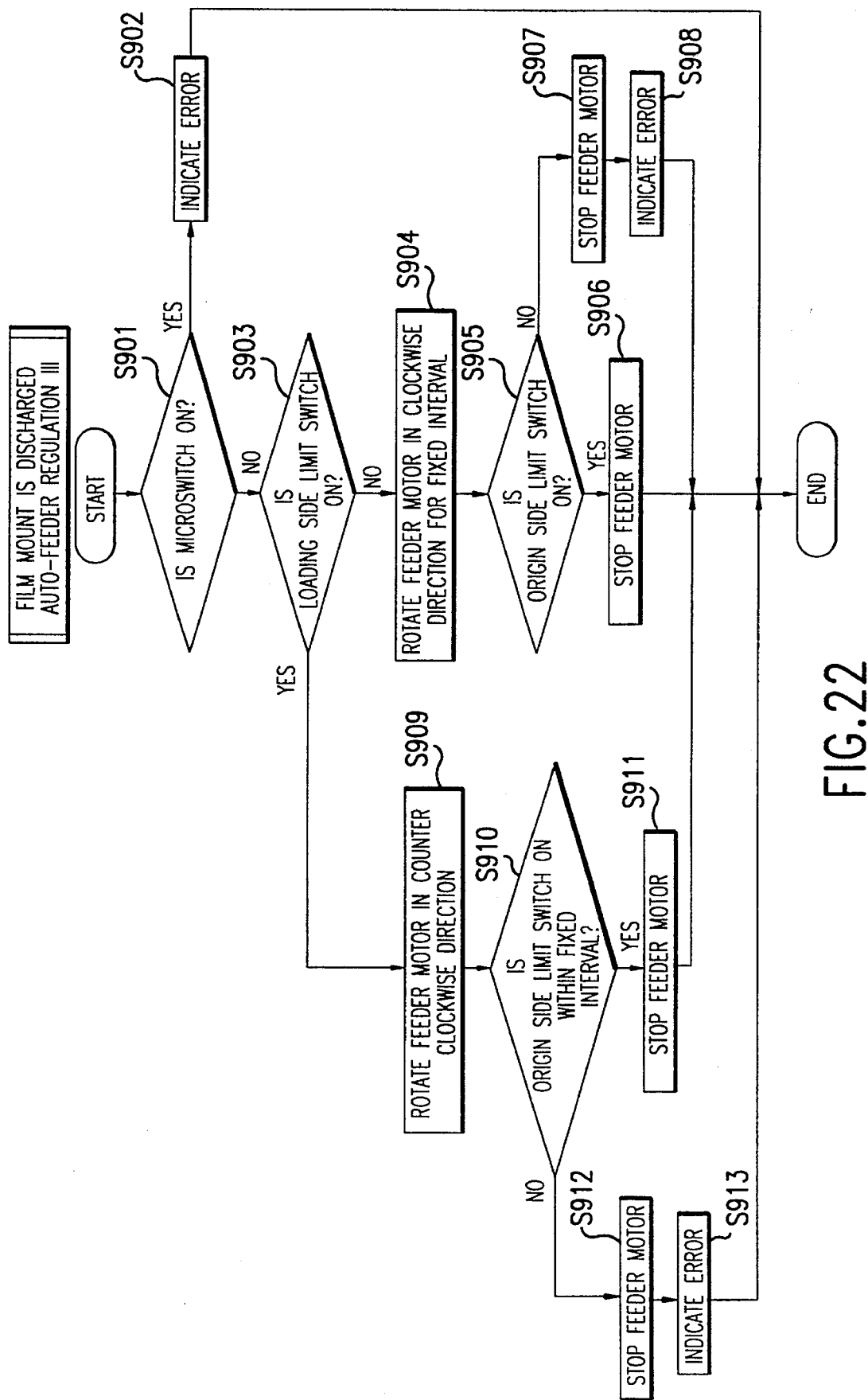
FIG. 22 is a flow chart depicting the regulating operating sequence of the auto-feeder when the film mount is discharged.

FIG. 22 is a flow chart depicting the auto-feeder regulation III at the time of film discharge. In step S901, the CPU determines whether the microswitch 57 is ON or OFF. When the microswitch 57 is ON, an error is indicated in step S902, and the operation ends. When the microswitch 57 is OFF, the CPU determines in step S903 whether the loading side limit switch 92 is ON. When the limit switch 92 is OFF, the pushing plate 78 is spaced from the loading side limit switch 92. In step S904, the feeder motor 71 rotates in the clockwise direction, and the pushing plate 78 moves in the origin direction. If this movement is carried out for a fixed interval such as, for example, 10 seconds, the pushing plate 78 will reach the origin side no matter what position the pushing plate 78 starts from. The film mount 102 will be discharged by the rubber rollers 85 during this interval. In step S905, the CPU determines whether the origin side limit switch 91 is ON or OFF. When the limit switch 91 is ON, the movement of the pushing plate is assumed to be normal. The rotation of the feeder motor 71 stops in step S906, and the operation ends. When the limit switch 91 is OFF, the rotation of the feeder motor 71 stops in step S907, and an error is indicated in step S908. The microswitch 57 described herein may be replaced by a suitable detection switch such as a photosensor or the like.

When the loading side limit switch 92 is ON in step S903, the pushing plate 78 is at the inserting end. When the feeder motor 72 is rotated in the clockwise direction in step S909, the pushing plate 78 moves in the direction of the origin. In step S910, the CPU determines whether the origin side limit switch 91 has turned ON within the fixed interval of 10 seconds or less. If the limit switch 91 has turned ON, the movement of the pushing plate has been normal. The rotation of the feeder motor 71 stops in step S911, and the operation ends. If the switch 91 is not ON, the rotation of the feeder motor 72 stops in step S912, and an error is indicated in step S913.

Figure 12:
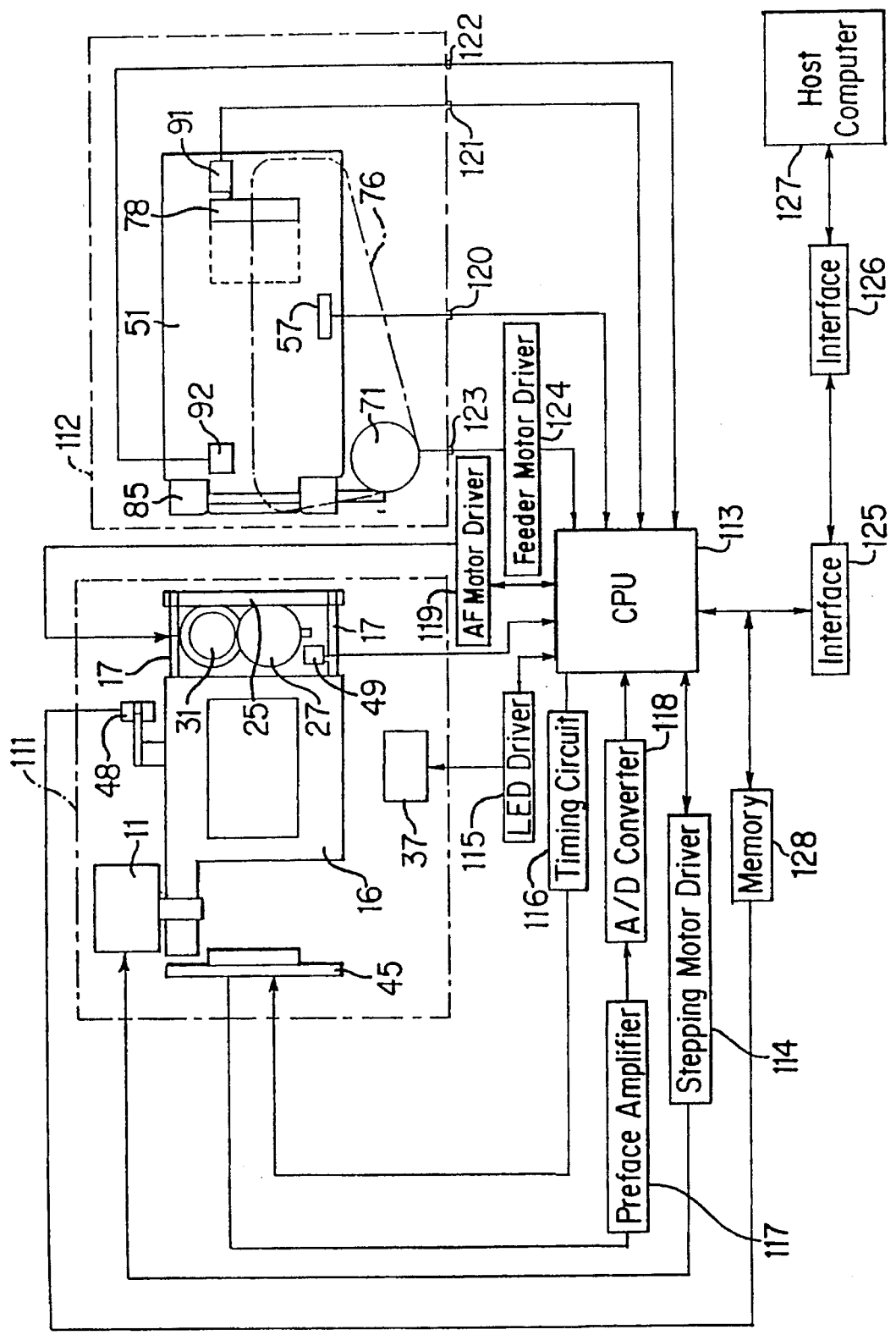
FIG. 12 is a block diagram depicting the electrical connection structure of an embodiment of the image input device and feeder of the present invention.
Figure 23:
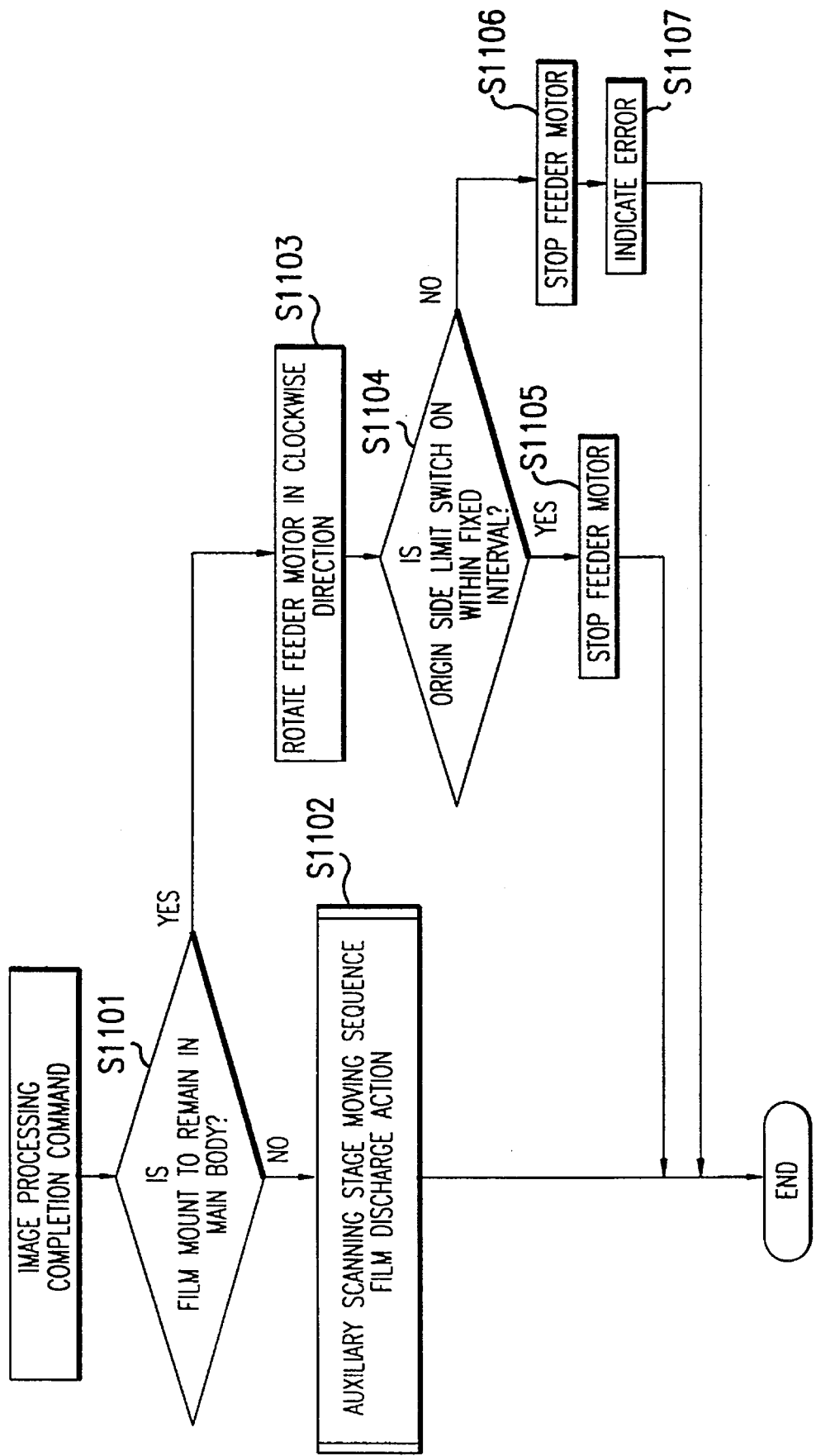
FIG. 23 is a flow chart depicting the operating sequence when an image processing completion command is sent from the host computer.

The operating sequence when an image processing command is sent from the host computer 127, shown in FIG. 12, is described with reference to the flow chart shown in FIG. 23. In step S1101, the CPU determines whether the referenced command is a command to end the operation with a film mount 102 left in the main body of the image input device 111. When the operation is to end without leaving a film mount within the image reading device, the film discharge action, shown in FIG. 16, is performed in step S1102. When a film mount is to remain in the image reading device, the feeder motor 71 rotates in the clockwise direction for a fixed interval such as, for example, 10 seconds in step S1103, and the pushing plate 78 moves in the origin direction. In step S1104, the CPU determines whether the origin side limit switch 91 is ON or OFF. If the limit switch 91 is ON, the rotation of the feeder motor 71 stops in step S1105, and the operation ends. If the limit switch 92 is OFF, the rotation of the feeder motor 71 stops in step S1106, and an error is indicated in step S1107.

The operating sequence when loading action commands are continually sent from the host computer 127 is described with reference to the flow charts of FIGS. 24–27.

Figure 24:
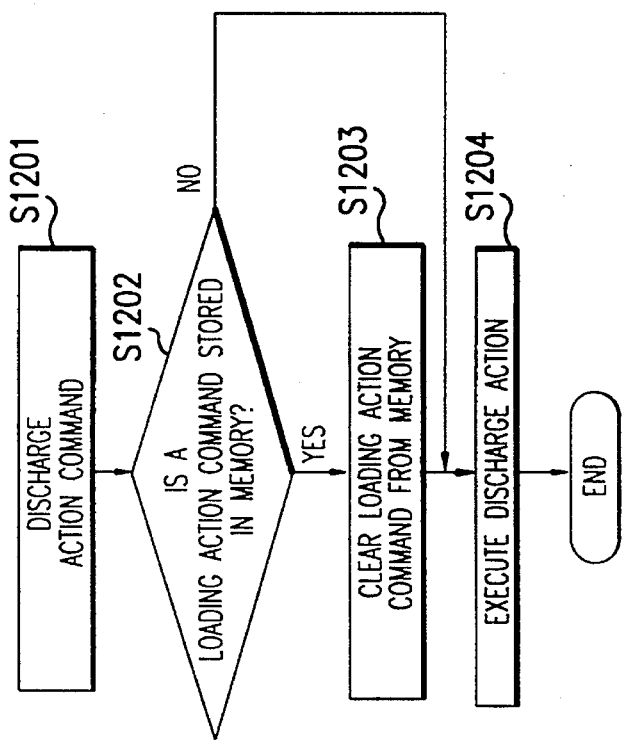
FIG. 24 is a flow chart depicting the operating sequence when a film mount discharge action command is sent from the host computer.

FIG. 24 is a flow chart depicting the operating sequence for a discharge action command sent from the host computer 127. A discharge action command is sent from the host computer in step S1201. In step S1202, the CPU determines whether a loading action command is stored in the memory 128, shown in FIG. 12. Storage of the loading action command to the memory 128 is carried out in steps S1303, S1403, S1407, S1507 and so forth, and will be described hereafter. If a loading action command is stored, the loading action command in the memory is cleared in step S1203. The operation of the CPU proceeds to step S1204. When a loading action command is not stored, the operation of the CPU proceeds directly to step S1204. In step S1204, the stepping motor rotates in the clockwise direction and executes a discharge action that moves the carriage 15 in the discharge direction. The operating sequence for a discharge action command such as in FIG. 24 is generated and carried out, and the insertion of two or more film mounts into the scanner body is prevented using one of the following three loading actions.

Figure 25:
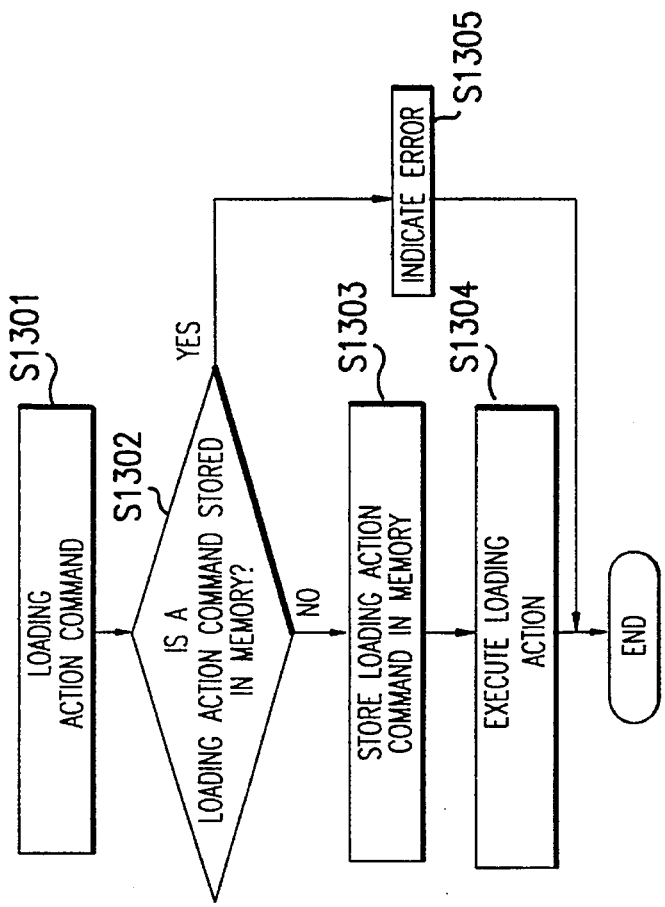
FIG. 25 is a flow chart depicting the operating sequence when a film loading action command is sent from the host computer.
Figure 26:
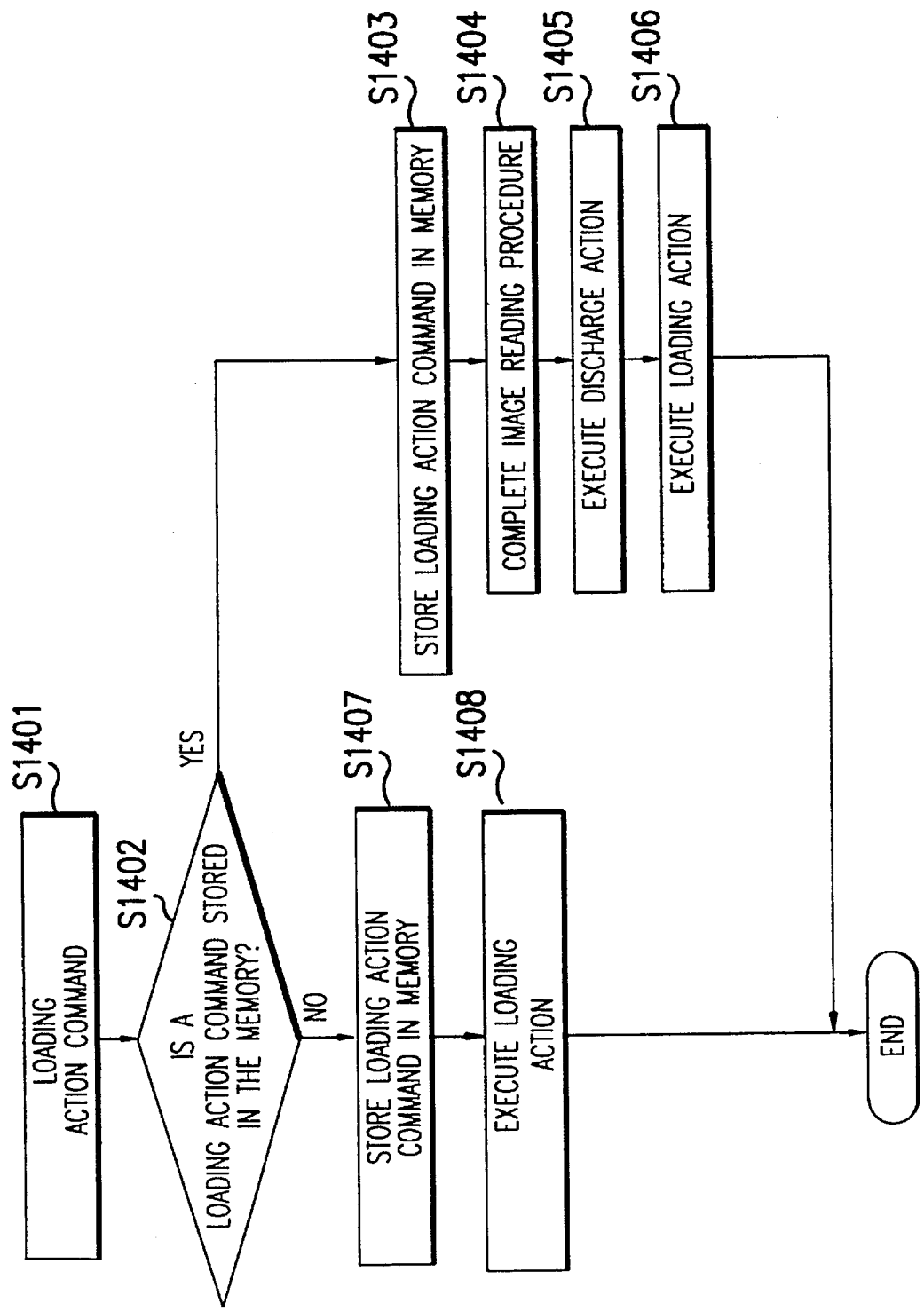
FIG. 26 is a flow chart depicting another operating sequence when a film loading action command is sent from the host computer.
Figure 27:
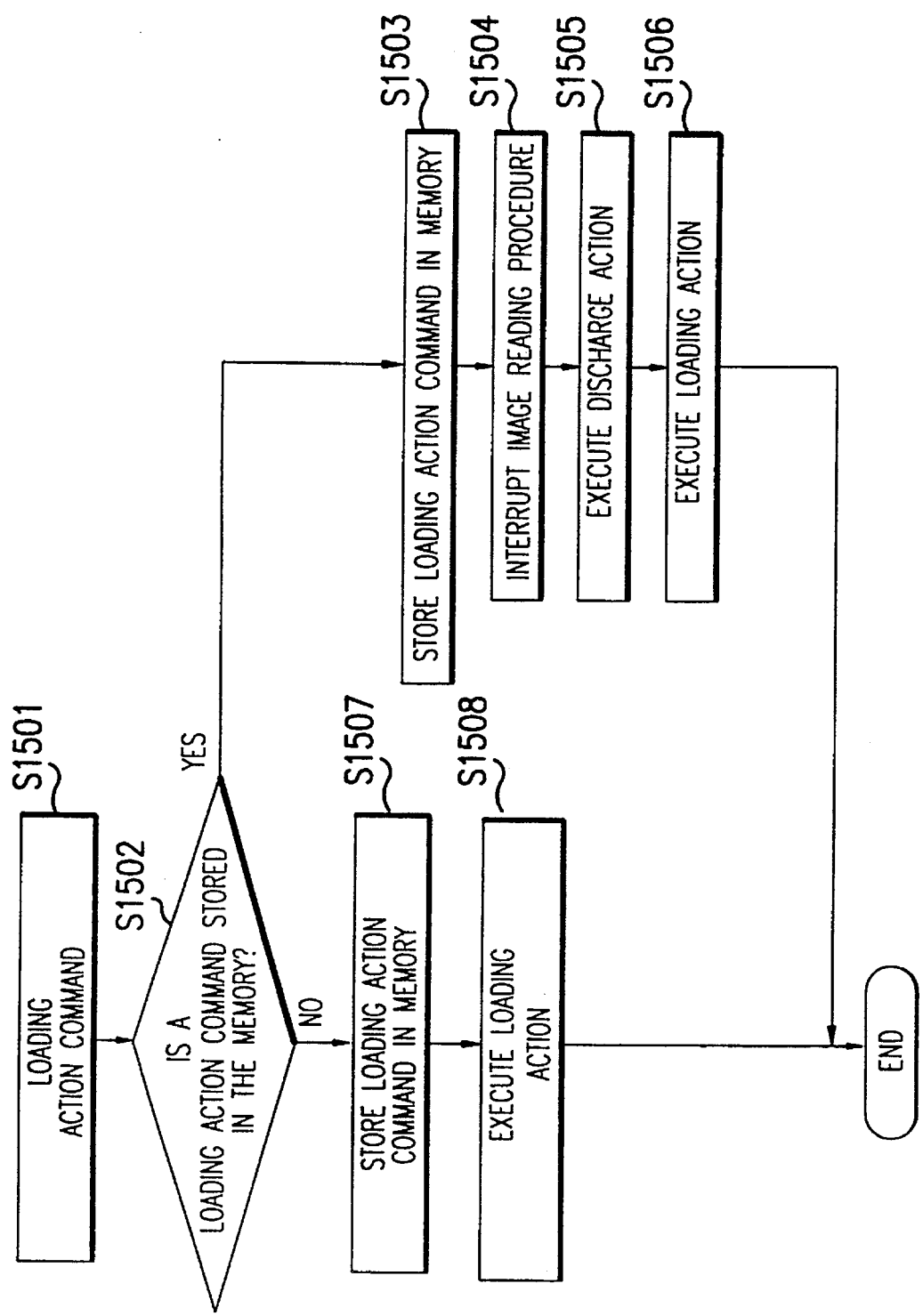
FIG. 27 is a flow chart depicting another operating sequence when a film loading action command is sent from the host computer.
Figure 28:
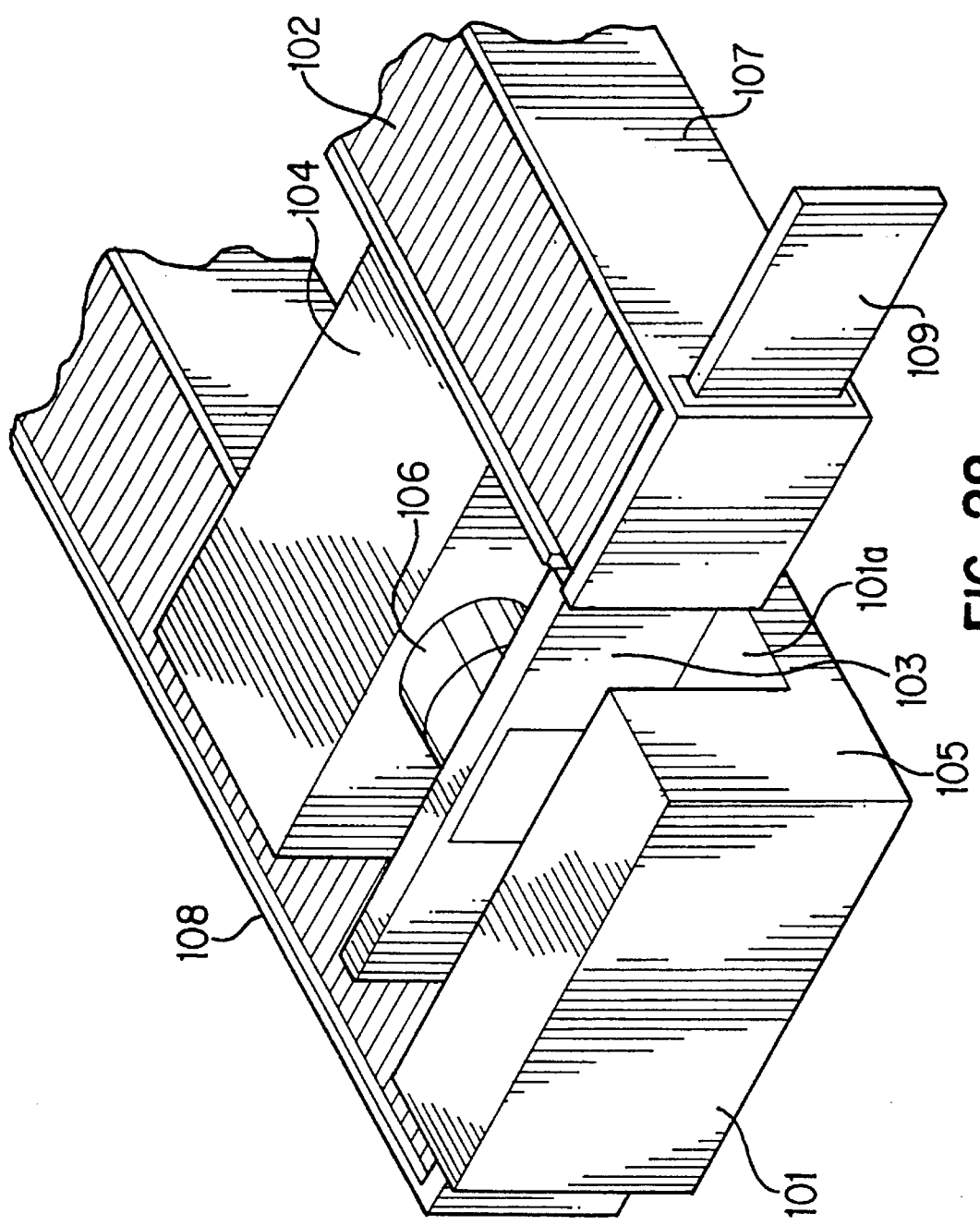
FIG. 28 is an oblique view of an example of a conventional feeder for use on an image input device.

FIGS. 25–27 depict the operating sequences for three instances in which loading action commands are continually generated.

In FIG. 25, a loading action command is generated in step S1301. In step S1302, the CPU determines whether a previous loading action command is stored in the memory 128. If a previous command is not stored, the loading action command is stored in step S1303. The operating sequence then proceeds to step S1304 and executes the loading action. When the CPU determines that a loading action command is stored, it is assumed that the loading action commands have been generated continually, and an error is indicated in step S1305. The error indication may take the form of an error display or audible indication. Additionally, further loading action commands are invalid. Unlike the operating sequences depicted in the flow charts of FIGS. 26 and 27, new loading action commands are not stored.

In FIG. 26, a loading action command is generated in step S1401. In step S1402, the CPU 113 determines whether a previous loading action command has been stored in the memory 128. If a previous command has been stored, the new loading action command is stored in the memory 128 in step S1403. After the image reading procedure for the previous film mount 102 has been completed in step S1404, the previous film mount 102 is discharged in step S1405. Next, in step S1406, the loading action is carried out according to the new loading action command stored in S1403. If a previous loading action command has not been stored in step S1402, the loading action command is stored in the memory 128 in step S1407, and the loading action is executed in step S1408 according to this loading action command.

In FIG. 27, steps S1501, S1502, S1503, S1505, S1506, S1507 and S1508 are the same as steps S1401, S1402, S1403, S1405, S1406, S1407 and S1408, respectively, shown in FIG. 26. The operating sequence differs in step S1504. In step S1504, the reading of a film mount 102 that has already been loaded is interrupted. The operating sequence cuts off even if the image reading action of the image input device 111 is in progress. In step S1505, the discharge action is performed. In step S1506, the loading action is executed based on the new loading action command.

According to the invention described above, the presence of a film mount can be detected by comparing the passing data of the image input device or the passing data used for compiling the shading data correction data with one line of data of the CCD within the image reading aperture position. It is not necessary to install a new sensor into the image input device in order to detect the film mounts, and the construction components can be reduced, lowering the cost of the system.

Even with an image input device that uses the same opening for loading and discharging, two film mounts will not be loaded on top of each other even if a film mount is present in the image input device when the loading action occurs directly after the power supply is connected. Thus, the damage or breakdown of the film mount and/or mechanism can be prevented, and errors associated with the loading action can be prevented.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A feeder for use in an image input system adapted to be mounted on an image input device of said image input system, said feeder comprising:

a loading magazine storing source documents, a source document of said source documents being inserted from said loading magazine into said image input device for reading image data from said source document;

a discharge magazine storing source documents discharged from said image input device, wherein said loading magazine and said discharge magazine are positioned on one side of said image input device and in parallel and in side-by-side relationship within said feeder; and a transport surface extending substantially perpendicular to an edge surface of said loading magazine and an edge surface of said discharge magazine.

2. The feeder according to claim 1, further comprising an opening unit through which said source document is inserted into said image input device from said feeder and discharged from image input device into said feeder.

3. The feeder according to claim 1, wherein said discharge magazine is positioned adjacent a front side of said feeder adjacent said image input device, and said loading magazine is positioned adjacent said discharge magazine in spaced relationship to said image input device.

4. The feeder according to claim 1, further comprising a dividing board used to control the direction of movement of said source document within said feeder during a loading operation of said source document from said feeder to said image input device and a discharging operation for said source document from said image input device to said feeder.

5. The feeder according to claim 4, wherein said dividing board is located on said edge surface of said discharge magazine.

6. The feeder according to claim 4, wherein said dividing board includes a pressure unit that presses a source document against said transport surface during said loading operation.

7. The feeder according to claim 4, wherein said dividing board includes an engaging unit that permits only one source document to be fed at a time into said image input device.

8. The feeder according to claim 4, wherein said dividing board includes a push-up unit that pushes said source document toward said discharge magazine to position said source document substantially parallel to said transport surface when said source document is discharged from said image input device during said discharging operation.

9. The feeder according to claim 4, wherein said source document is mounted in an opening of a frame, said opening having a short side and a long side, said dividing board having a first section having a dimension greater than said short side of said opening.

10. The feeder according to claim 9, wherein said dividing board has a second section having a dimension greater than said long side of said opening.

11. The feeder according to claim 1, further comprising:

an extrusion board that inserts said source document from said loading magazine into said image input device along said transport surface;

a pair of rollers that discharge said source document discharged from said image input device into said discharge magazine; and a driving source to drive said extrusion board and said pair of rollers.

12. The feeder according to claim 11, wherein one edge of said extrusion board is substantially perpendicular to said transport surface and an opposite edge is less than perpendicular to said transport surface.

13. The feeder according to claim 11, wherein said driving source includes a roller driving mechanism that opens said pair of rollers during a loading operation of said source document from said feeder to said image input device, said roller driving mechanism closing said pair of rollers during a discharge operation of said source document from said image input device to said feeder.

14. The feeder according to claim 11, further comprising:

a loading magazine pressure board applying a force against said source documents within said loading magazine;

a discharge magazine pressure board applying a force against said source documents within said discharge magazine, wherein said force applied by said loading magazine pressure board is greater than said force applied by said discharge magazine pressure board.

15. The feeder according to claim 1, further comprising a first detector and a second detector provided on opposite edges of said transport surface, wherein said first and second detectors detect completion of a loading operation and a transport operation of said source document within said feeder.

16. The feeder according to claim 15, further comprising an extrusion board to extrude said source document, wherein said first and second detectors detect the location of said extrusion board.

17. The feeder according to claim 16, further comprising a controller that monitors said first and second detectors and indicates when said first and second detectors fail to detect said extrusion board within a specified time interval.

18. An image input system comprising:

an image input device for reading image data from a source document, said image input device having a carriage to hold said source document, wherein said carriage is movable in a secondary scanning direction substantially perpendicular to a primary scanning direction, a light source to emit light along an optical axis substantially orthogonal to said secondary scanning direction to illuminate said source document, and a position adjustment mechanism to adjust the position of said carriage along said optical axis of said light source;

a feeder that loads said source document into said image input device during a loading operation and receives said source document from said image input device during a discharge operation, said feeder including a loading magazine storing source documents to be loaded into said image input device during said loading operation, a discharge magazine storing source documents discharged from said image input device, said loading magazine and said discharge magazine being positioned on one side of said image input device and in parallel and in side-by-side relationship within said feeder, and a transport surface extending substantially perpendicular to an edge surface of said loading magazine and an edge surface to said discharge magazine; and a controller that controls the operation of said position adjustment mechanism to position said carriage in said optical axis direction, said carriage being located in a first predetermined position during said loading operation of said source document and a second predetermined position during said discharging operation of said source document.

19. The image input system according to claim 18, wherein said source document is mounted on a film mount having a thickness, said first predetermined position of said carriage during said loading operation being such that the difference between the position of said transport surface of said feeder and the position of a central surface on said carriage is approximately half of the thickness of said film mount.

20. The image input system according to claim 18, the feeder further comprising a pair of discharge rollers having a contact surface, said second predetermined position of said carriage during said discharge operation of said source document being such that said contact surface of said pair of rollers and a central surface on said carriage nearly coincide.

21. The image input system according to claim 18, wherein said position adjustment mechanism is a focus adjustment mechanism for said source document within said image input device.

22. The image input system according to claim 21, wherein said focus adjustment mechanism includes a motor for driving said focus adjustment mechanism.

23. A feeder for use in an image input system adapted to be mounted on an image input device of said image input system, said feeder comprising:

loading storage means for storing source documents to be inserted into said image input device for reading image data from said source document;

discharge storage means for storing source documents discharged from said image input device; and transport means for transporting said source documents within said feeder;

said discharge storage means being positioned adjacent a front side of said feeder adjacent said image input device and said loading storage means being positioned adjacent said discharge storage means in spaced relationship to said image input device.

24. The feeder according to claim 23, further comprising opening means for inserting a source document of said source documents into said image input means from said feeder means and discharging said source document from said image input means into said feeder.

25. The feeder according to claim 23, further comprising dividing control means for controlling the direction of movement of said source document within said feeder during a loading operation of said source document from said feeder to said image input device and a discharging operation for said source document from said image input device to said feeder.

26. The feeder according to claim 25, wherein said dividing control means includes pressure means for pressing said source document against said transport means during said loading operation.

27. The feeder according to claim 25, wherein said dividing control means includes engaging means for engaging said source document to permit only one source document to be fed during said loading operation into said image input device.

28. The feeder according to claim 25, wherein said dividing control means includes pushing means for pushing said source document toward said discharge storage means to position said source document when said source document is discharged from said image input device during said discharge operation.

29. The feeder according to claim 23, further comprising:

insertion means for inserting said source document from said loading storage means into said image input device;

extraction means for discharging said source document discharged from said image input device into said discharge storage means; and driving means for driving said insertion means and said extraction means.

30. The feeder according to claim 23, further comprising:

loading pressure means for applying a force against said source documents within said loading storage means; and discharge pressure means for applying a force against said source documents within said discharging storage means.

31. The feeder according to claim 23, further comprising:

detection means for detecting the completion of a loading operation and a transport operation of said source document within said feeder.

32. An image input system comprising:

image input means for reading image data from a source document, said image input means includes a mobile and adjustable source document transport means for moving said source document within said image input means in a secondary scanning direction substantially perpendicular to a primary scanning direction, light generating means for emitting light along an optical axis substantially orthogonal to said secondary scanning direction to illuminate said source document, and position adjustment means for adjusting the position of said image input means along said optical axis of said light source;

feeder means for loading said source document into said image input means during a loading operation and receiving said source document from said image input means during a discharge operation, said feeder means including loading storage means for storing source documents to be inserted into said image input device for reading image data from said source document, discharge storage means for storing source documents discharged from said image input device, and transport means for transporting said source document within said feeder means; and control means for controlling the operation of said position adjustment means;

said loading storage means and said discharge storage means being positioned on one side of said image input means and in parallel and in side-by-side relationship within said feeder means.

33. A method of reading image information from a source document on a movable carriage in an image input device, said method comprising the steps of:

adjusting the position of said carriage within said image input device to a loading position;

loading a source document from a loading magazine in a feeder into said image input device;

positioning said source document on said carriage within said image input device, said carriage being movable in a secondary scanning direction;

reading image information from said source document within said image input device;

adjusting the position of said carriage within said image input device to a discharging position; and discharging said source document from said image input device into a discharge magazine in said feeder.

34. The method according to claim 33, further comprising passing said source document through a single opening in said image input device during said loading and discharging steps.

35. The method according to claim 33, wherein the steps of loading and discharging said source document include guiding said source document within said feeder with a dividing board to control the direction of movement of said source document within said feeder.

36. The method according to claim 35, wherein the step of loading said source document includes applying pressure with said dividing board against said source document to press said source document against a transport surface within said feeder.

37. The method according to claim 35, wherein the step of discharging said source document includes pushing said source document with a push-up unit of said dividing board toward said discharge magazine.

38. The method according to claim 33, wherein the step of loading said source document includes inserting said source document into said image input device with an extrusion board positioned on a transport surface within said feeder.

39. The method according to claim 33, wherein the step of discharging said source document includes engaging said source document with a pair of rollers on said feeder that engage said source document as said source document is discharged from said image input device into said discharge magazine.

40. The method according to claim 33, further comprising the step of detecting the completion of said loading step.

* * * * *